(12) United States Patent
Pedersen et al.

(10) Patent No.: US 6,879,590 B2
(45) Date of Patent: Apr. 12, 2005

(54) METHODS, APPARATUSES AND SYSTEMS FACILITATING AGGREGATION OF PHYSICAL LINKS INTO LOGICAL LINK

(75) Inventors: Soren Bo Pedersen, Petaluma, CA (US); Radimir Shilshtut, Rohnert Park, CA (US); Danny Thom, Santa Rosa, CA (US); Sina Soltani, Rohnert Park, CA (US); Lauren Trevor May, Penngrove, CA (US)

(73) Assignee: Valo, Inc., Petaluma, CA (US)

( * ) Notice: Subject to any disclaimer, the term of this patent is extended or adjusted under 35 U.S.C. 154(b) by 0 days.

(21) Appl. No.: 10/202,108

(22) Filed: Jul. 24, 2002

(65) Prior Publication Data

US 2004/0062198 A1 Apr. 1, 2004

Related U.S. Application Data

(60) Provisional application No. 60/375,730, filed on Apr. 26, 2002.

(51) Int. Cl.[7] .......................... H04L 12/28; H04L 12/56
(52) U.S. Cl. ............ 370/394; 370/395.51; 370/395.54; 370/399; 370/409
(58) Field of Search ................ 370/395.51–395.53, 370/394, 412, 901–907, 389, 392, 395.1, 397, 399, 395.3–395.4, 409

(56) References Cited

U.S. PATENT DOCUMENTS

| | | | | |
|---|---|---|---|---|
| 5,617,417 A | * | 4/1997 | Sathe et al. ................... | 370/394 |
| 5,875,192 A | * | 2/1999 | Cam et al. ................ | 370/395.7 |
| 5,953,339 A | * | 9/1999 | Baldwin et al. ............ | 370/397 |
| 6,205,142 B1 | * | 3/2001 | Vallee ......................... | 370/394 |
| 6,222,858 B1 | * | 4/2001 | Counterman ................ | 370/474 |
| 6,490,296 B2 | * | 12/2002 | Shenoi et al. ................ | 370/469 |
| 6,510,156 B1 | * | 1/2003 | Brock et al. ............. | 370/395.1 |
| 6,563,821 B1 | * | 5/2003 | Hong et al. .................. | 370/389 |
| 2002/0089715 A1 | * | 7/2002 | Mesh et al. .................. | 359/118 |
| 2002/0114276 A1 | * | 8/2002 | Basturk ....................... | 370/230 |

FOREIGN PATENT DOCUMENTS

| WO | WO2000/33487 | * | 8/2000 | ............ H04B/7/26 |
|---|---|---|---|---|

OTHER PUBLICATIONS

Inverse Multiplexing for ATM (IMA) Specification Version 1.1, The ATM Forum Technical Committee, AF–PHY–0086.001, Mar., 1999.*

Sklower et al., The PPP Multilink Protocol, IETF RFC 1990 (Aug. 1996).

Technical Committee, the ATM Forum, Inverse Multiplexing for ATM (IMA) Specification Version 1.1 (AF–PHY–0086.001) Mar. 1999.

* cited by examiner

*Primary Examiner*—Afsar Qureshi
(74) *Attorney, Agent, or Firm*—Mark J. Spolyar

(57) ABSTRACT

Methods, apparatuses and systems facilitating the aggregation or bonding of physical communications links into higher-bandwidth logical links. A novel link bonding and encapsulation protocol scheme that optimizes the efficiency of data transfer across the physical links, while still allowing for desired Quality of Service (QoS) levels to high-priority traffic, such as voice data, with low delay requirements. Data streams are divided and concurrently transported over multiple physical links that are aggregated or bonded together to form one logical link. At the receive end, the original cell streams are recovered from the bonded logical links. In one embodiment, the physical links are xDSL links transmitting and receiving signals via conventional copper twisted-pair cabling. In one embodiment, the present invention allows telecommunications service providers to leverage their investments in existing twisted pair connection technologies to deliver high-bandwidth services to customers in a fast and cost-efficient manner.

22 Claims, 13 Drawing Sheets

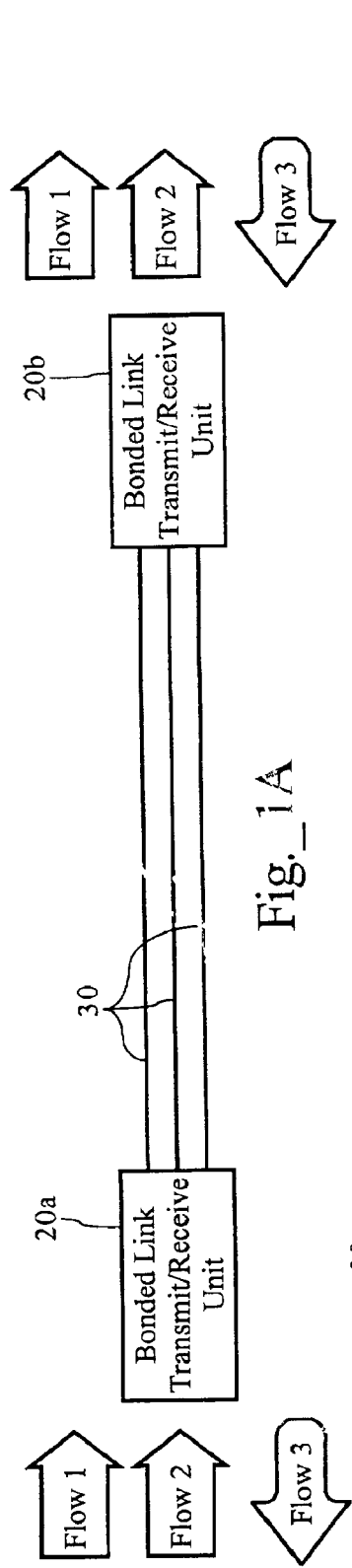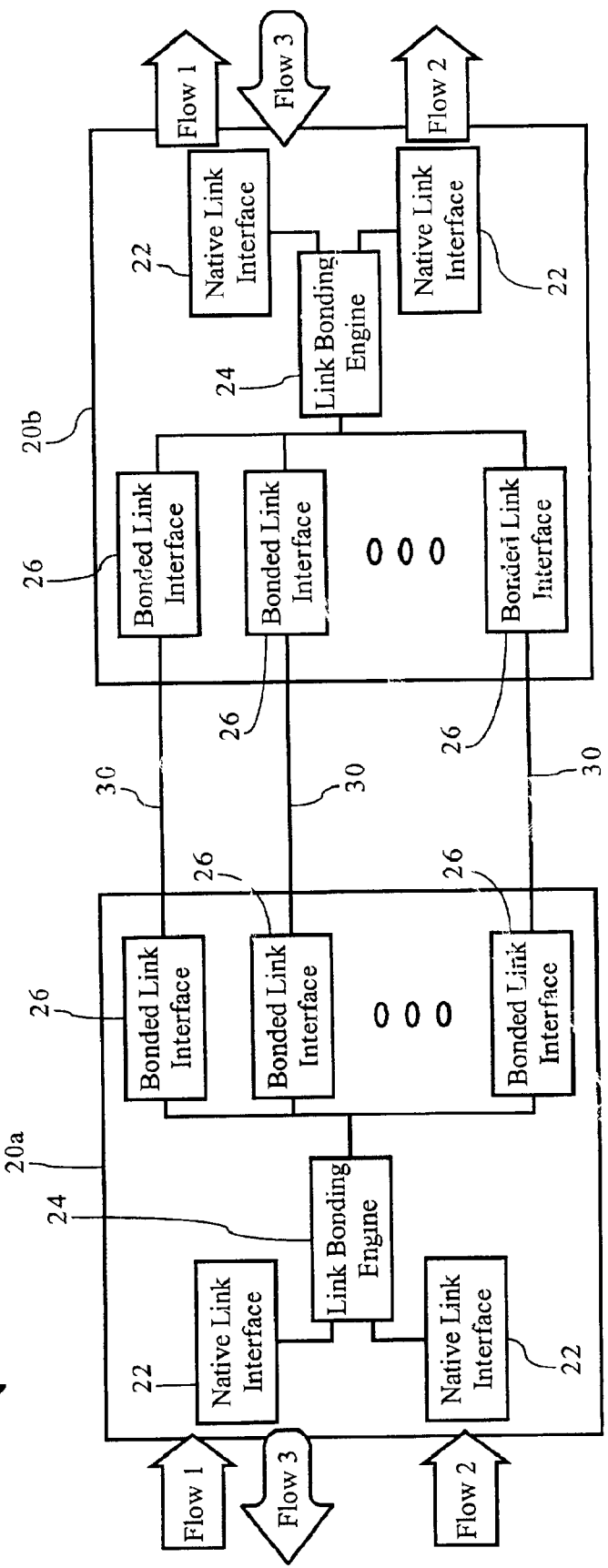

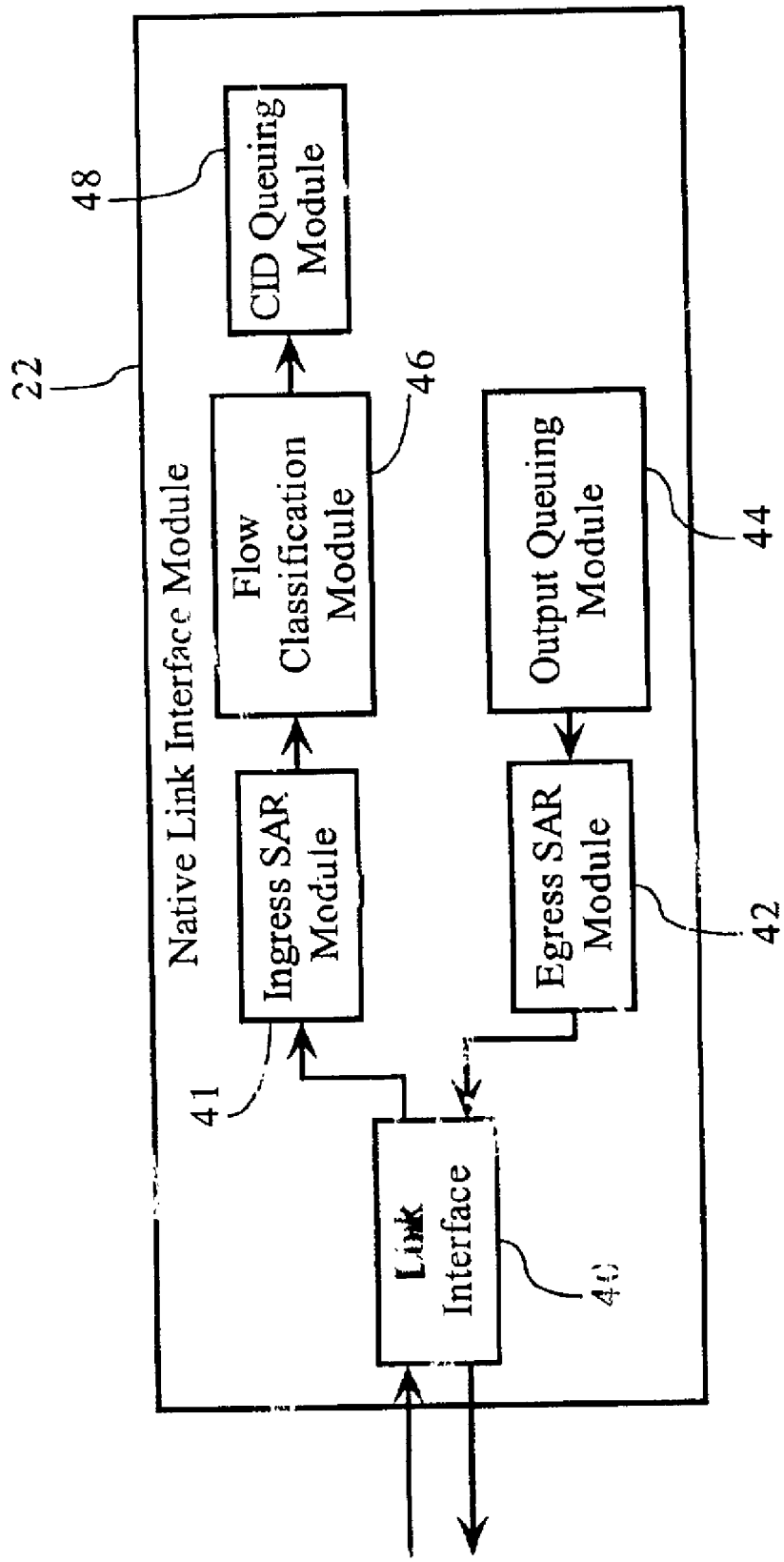
Fig._2

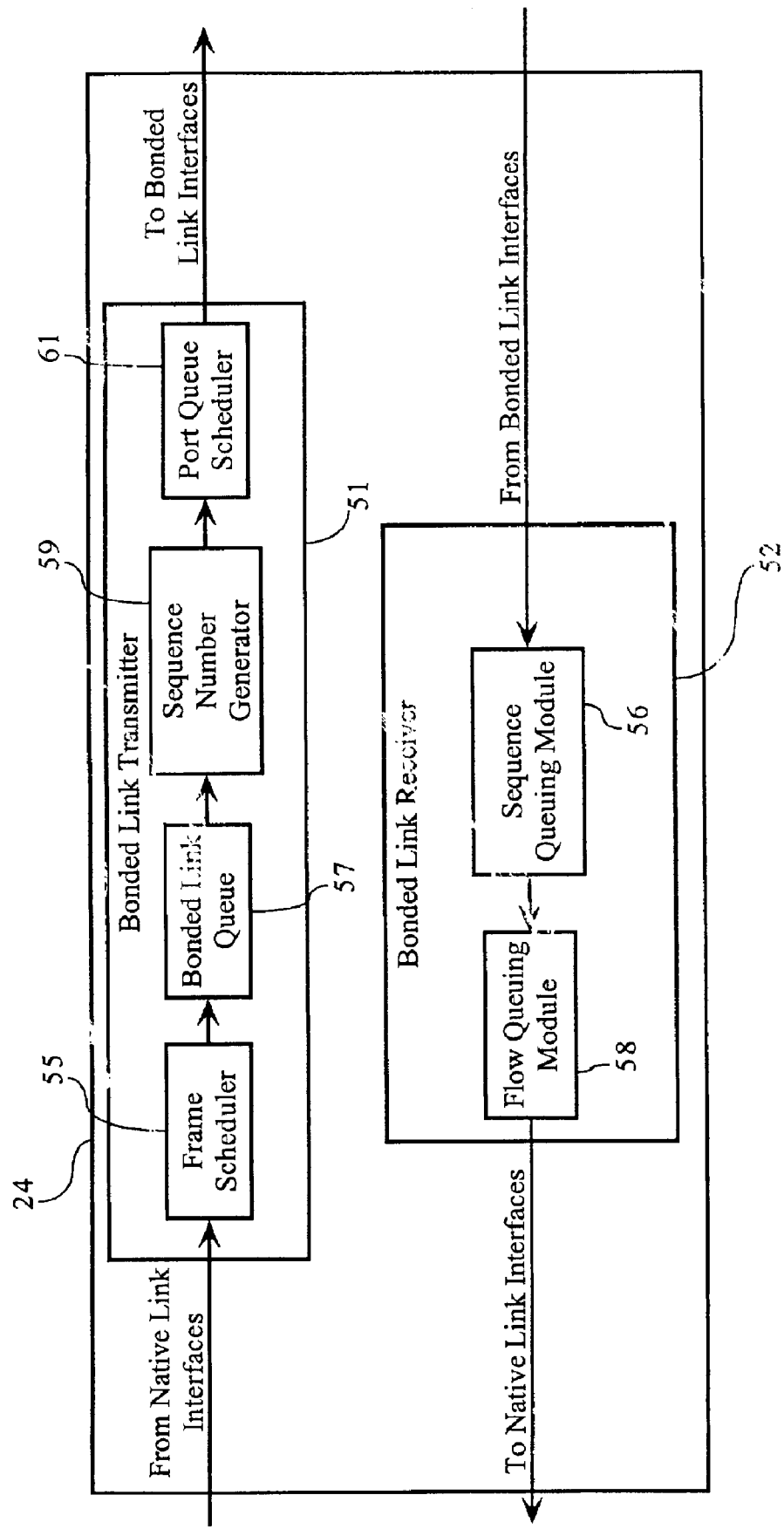
Fig._3

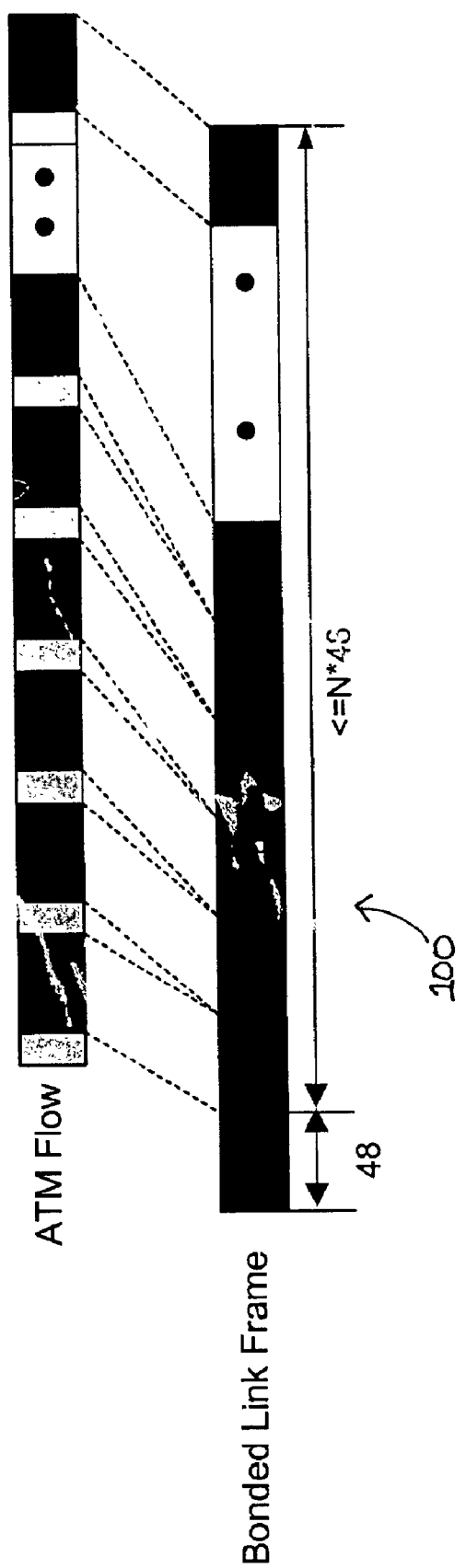
Fig._6

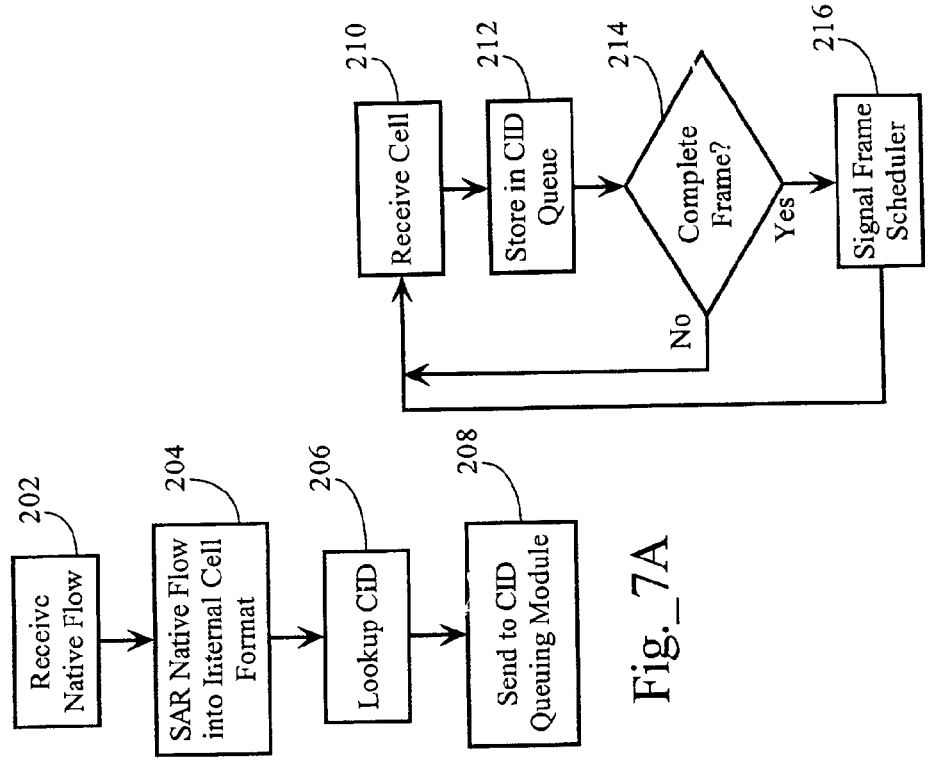
Fig. 7D
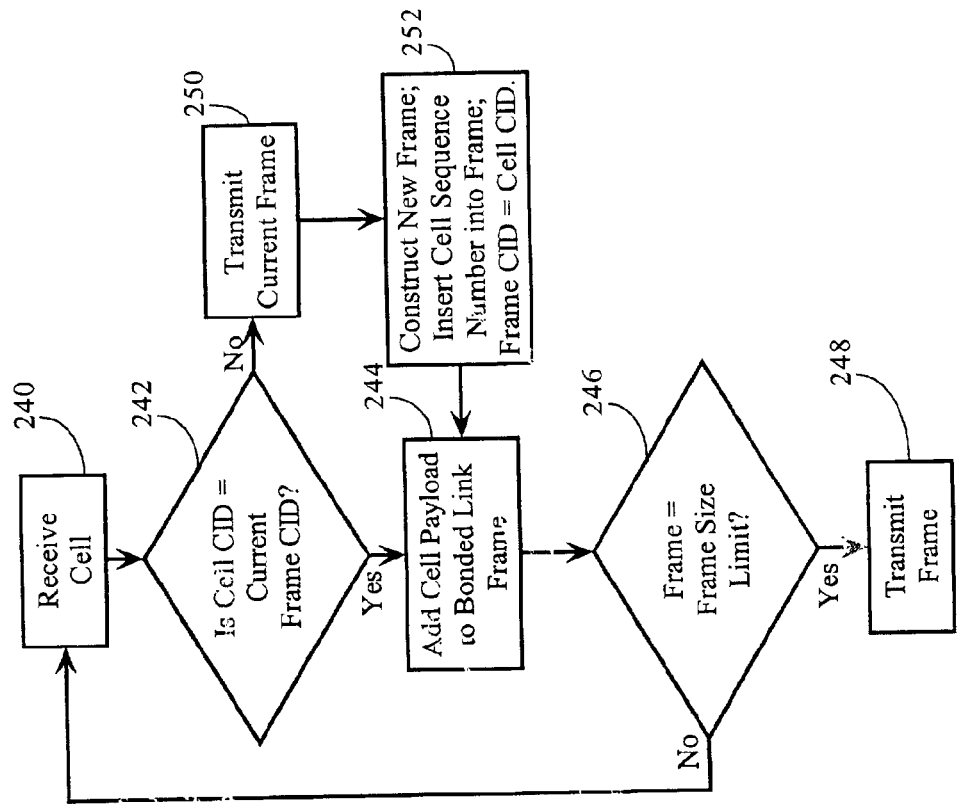
Fig. 7B
Fig. 7A

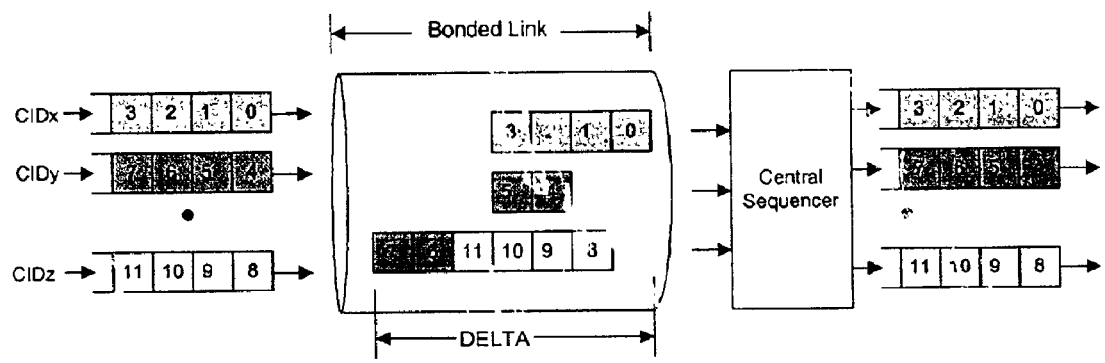
Fig._8A
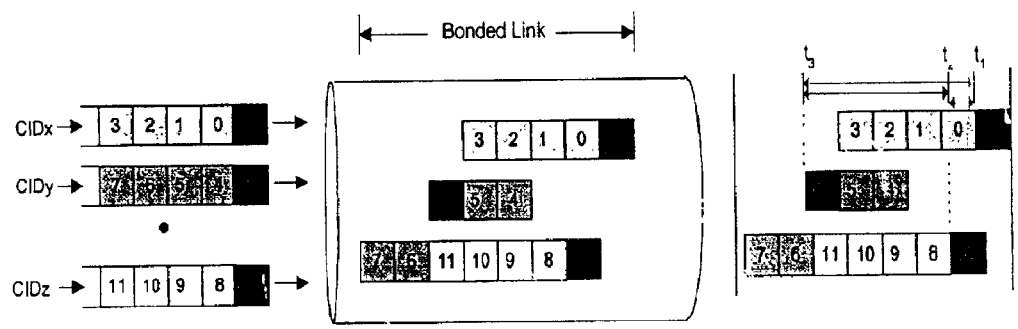
Fig._8B

| Address | BIT | | | |
|---|---|---|---|---|
| | 35 | | | 0 |
| 0x000 | Queue Depth[16:0] | Delta[15:0] | | RFU[2:0] |
| 0x001 | start sequeunce[16:0] | timestamp[16:0] | | RFU[1:0] |
| 0x002 | RFU | write address[16:0] | RV | read address[16:0] |
| 0x003 | Queued cells[16:0] | RFU[18:0] | | |

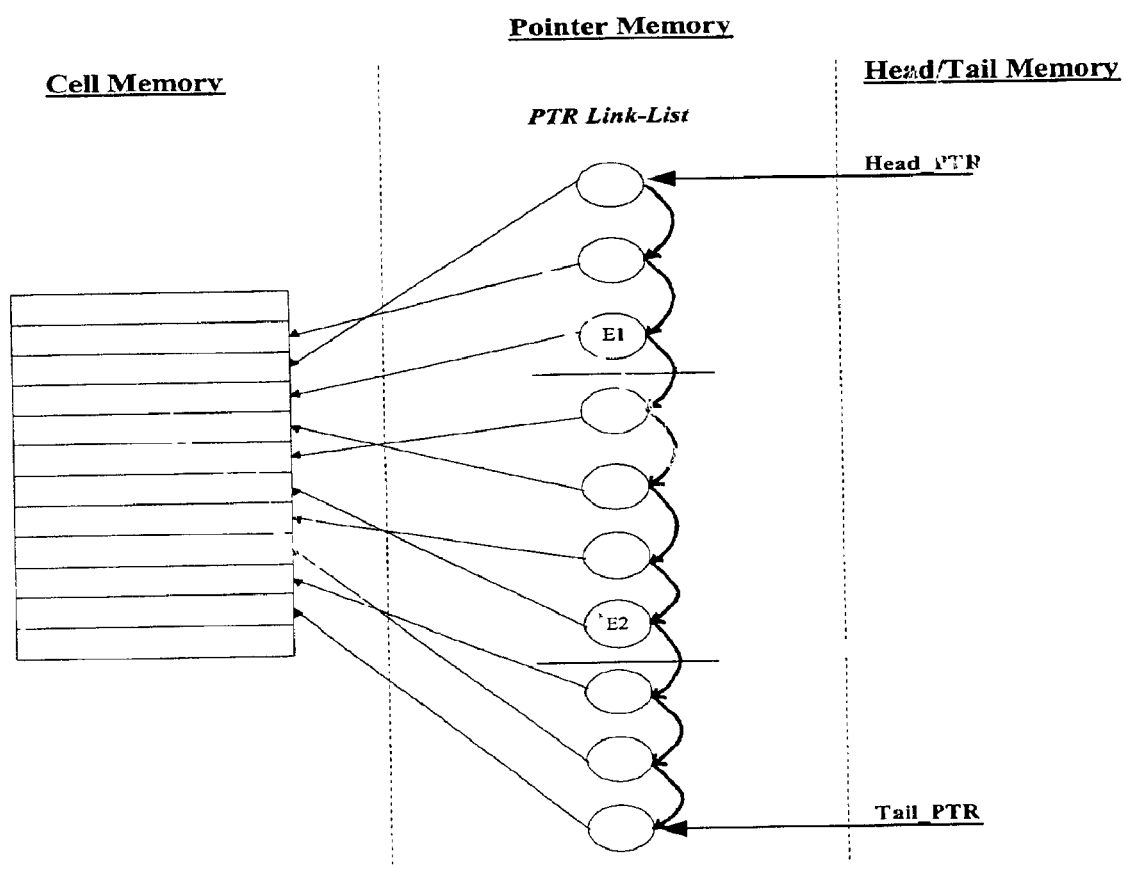
Fig._11

METHODS, APPARATUSES AND SYSTEMS FACILITATING AGGREGATION OF PHYSICAL LINKS INTO LOGICAL LINK

RELATED APPLICATION

The present application claims priority from U.S. Provisional Application Ser. No. 60/375,730 filed Apr. 26, 2002 and entitled "Methods, Apparatuses and Systems Facilitating Aggregation of Physical Links into Logical Link."

FIELD OF THE INVENTION

The present invention relates to telecommunications systems and, more particularly, to methods, apparatuses and systems enabling a link bonding scheme facilitating the aggregation of physical links into higher-bandwidth, logical links.

BACKGROUND OF THE INVENTION

DS1 links, providing an access capacity of 1.5 Megabits per second (Mbps), dominate the existing access infrastructure. The next logical bandwidth step in the PDH/SDH hierarchy is DS3, which delivers an access capacity of roughly 45 Mbps. DS3 links, however, are unattractive to many enterprise customers since electrical DS3 solutions are capable of supporting access links of only about 900 feet in length, therefore mandating use of expensive optical fiber and optical network equipment for any access link spanning a significant distance. Accordingly, customers requiring more bandwidth than a DS1 link, found themselves reluctant to incur the expense associated with DS3 links. Therefore, it quickly became apparent that a better solution was needed.

Accordingly, several inverse multiplexing solutions have been proposed and implemented for aggregating two or more physical links into higher-bandwidth, virtual links. For example, link bonding solutions have been developed that attempt to solve these problems by aggregation of several DS1 links into one virtual or logical link at layer 2 or the link layer of the OSI reference model. Multiplexing refers to techniques for combining multiple data streams for transmission over a given high-speed circuit. In direct contrast, inverse multiplexing refers to techniques for using multiple circuits, such as T1 lines, behaving as a single logical link to transmit a given data stream. That is, inverse multiplexing divides a data stream into multiple concurrent streams that are transmitted at the same time across separate physical links or channels. At the other end of these channels, the multiple data streams are then reconstructed back into the original data stream.

Inverse multiplexing schemes are known in the art. For example, the Inverse Multiplexing for ATM (IMA) Specification Version 1.1 (ATM Forum 1999), describes an inverse multiplexing protocol for transmitting ATM cell streams over multiple physical links and the retrieval of the original data stream at the far-end of the physical links. The ATM link aggregation solution was specifically designed to facilitate the aggregation of several DS1/E1 ATM links. The IMA solution was developed with certain main requirements in mind: 1) the ability to bond between 2 and 32 links; 2) the ability to bond both synchronous and asynchronous links; 3) the solution must be transparent to the ATM layer (and layers above the ATM layer); and 4) the solution must have carrier class features for stability, redundancy and fail-over.

For IMA, the third requirement ends up being the most taxing on the solution, because an ATM cell is a fixed size packet, and therefore does not allow for the simple addition of a sequence number to every cell to allow for re-sequencing of the data stream at the receiving end. The IMA solution instead introduced the concept of blocks, and establishes sequence integrity across the links by assigning sequence numbers to the blocks. A block is comprised of a fixed number of ATM cells, i.e. either 32,64, 128 or 256. The default block size is 128 cells. IMA control cells define block boundaries and, among other things, include the block sequence number, and the offset of the control cell inside of the IMA block. The IMA scheme works by assigning a link priority at link initialization, and allocates the transmission stream in round-robin fashion equally among all links. The IMA scheme, uses the priority scheme to re-establish the correct cell stream sequence on the receiving end.

When the bonded links operate at different frequencies, however, the block alignments would slowly drift from each other. The IMA solution solves this issue by using cell-stuffing events. Specifically, the IMA frequency compensation scheme works by essentially introducing stuff events on the faster links, and thereby creating a nominal effective link bandwidth that is equal for all links (i.e., it effectively synchronizes all links to the slowest common denominator). The IMA solution identifies one link as being the nominal timing reference. This link has a cell-stuffing event introduced by default every 2048 cells. According to the IMA specification, the remaining links can have a cell-stuffing event introduced no more than every 5th super frame. These conditions limit the allowable difference in link speed among the bonded links. The amount of frequency offset between the links for which the IMA scheme can compensate depends on the nominal frequency of the links, and the IMA super frame size.

The IMA link bonding scheme can be used to bond other types of physical links, such as xDSL links. However, the minimal allowable link speed difference supported by IMA is a substantial obstacle against such an implementation. Even assuming this obstacle can be overcome, IMA still suffers from the inefficiencies introduced by the cell-stuffing events that bring the effective user bandwidth capacity of all links down to the lowest common denominator.

In light of the foregoing, a need in the art exists for link bonding schemes that efficiently utilize the available link capacity and more fluidly handle difference in link speed. Embodiments of the present invention substantially fulfill these needs.

SUMMARY OF THE INVENTION

The present invention provides methods, apparatuses and systems facilitating the aggregation or bonding of physical communications links into higher-bandwidth logical links. The link bonding and encapsulation protocol scheme of the present invention allows for an embodiment that optimizes the efficiency of data transfer across the physical links, while still allowing for desired Quality of Service (QoS) levels to high-priority traffic, such as voice data, with low delay requirements. Embodiments of the present invention allow a variety of service types to be transported transparently over bonded physical links. According to one embodiment, data streams are divided and concurrently transported over multiple physical links that are aggregated or bonded together to form one logical link. At the receive end, the original cell streams are recovered from the bonded logical links. In one embodiment, the physical links are xDSL links transmitting and receiving signals via conventional copper twisted-pair cabling. In one embodiment, the present invention allows telecommunications service providers to leverage their investments in existing twisted pair connection technologies to deliver high-bandwidth services to customers in a fast and cost-efficient manner.

DESCRIPTION OF THE DRAWINGS

FIG. 1A is a functional block diagram illustrating operation of the link aggregation functionality according to one embodiment of the present invention.

FIG. 1B is a functional block diagram setting forth an overall system architecture according to one embodiment of the present invention.

FIG. 2 is a functional block diagram showing the functionality associated with a native link interface according to one embodiment of the present invention.

FIG. 3 is a functional block diagram illustrating the functionality of the link bonding engine according to an embodiment of the present invention.

FIG. 6 illustrates the mapping of an ATM flow to a bonded link encapsulation scheme according to an embodiment of the present invention.

FIGS. 7A–7D are flow chart diagrams providing methods allowing for the transmission of a data stream across multiple physical links.

FIG. 8A is a functional diagram illustrating the operation of the link aggregation functionality according to one embodiment of the present invention.

FIG. 8B is a functional diagram showing the introduction of super frames across the physical links.

FIG. 11 is a diagram illustrating the logical structure of a flow/CID queue.

DESCRIPTION OF PREFERRED EMBODIMENT (S)

I. Operating Environment

A. Functional Overview

Figure 4:
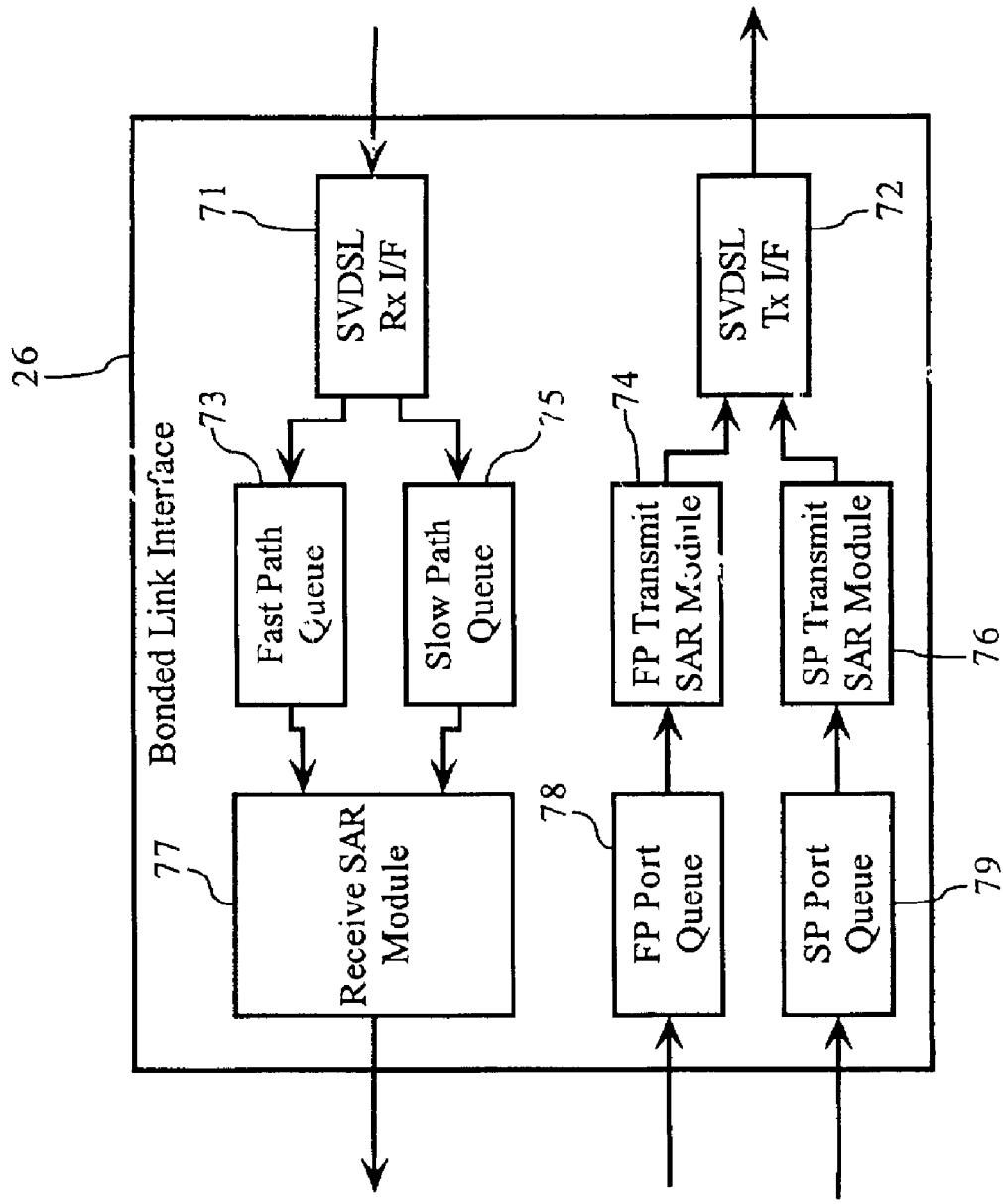
FIG. 4 is a functional block diagram setting forth the functionality of a bonded link interface according to one embodiment of the present invention.

FIG. 1A illustrates operation of the link aggregation functionality according to one embodiment of the present invention. As FIG. 1 illustrates, a plurality of physical links 30 operably connect a first bonded link transmit/receive unit 20*a* to a second bonded link transmit/receive unit 20*b*. As discussed more fully below, bonded link transmit/receive unit 20*a*, in the transmit direction (e.g., flows 1 and 2), processes native flows and transmits them across one or more bonded links 30 to a second bonded link transmit/receive unit 20*b*, which reassembles the native flows for further transmission. As FIG. 1A illustrates, bonded link transmit/receive units 20*a* and 20*b* also operate in the reverse direction. In addition, as FIG. 1A illustrates, the link aggregation system transports native flows transparently across bonded links 30. In one embodiment, physical link 30 is an xDSL link, such as a VDSL link. Of course, one skilled in the art will recognize that other bonded link transmission protocols and technologies can be employed.

FIG. 1B illustrates a system architecture according to one embodiment of the present invention. As FIG. 1B illustrates, bonded link transmit/receive unit 20*a*, 20*b* comprises link bonding engine 24, at least one native link interface 22 and at least two bonded link interfaces 26. Native link interface 22 is operative to receive and transmit native flows to remote devices over a native link protocol. Link bonding engine 24 is operative to aggregate physical links 30 into a single logical link, as described more fully below. Bonded link interface 26 is operative, in connection with a second bonded link interface, to transmit and receive data flows across a physical link 30.

A.1. Native Flows and Native Link Interfaces

The present invention can be configured to transparently transport a vast array of different native flow types across bonded links 30. For example, the present invention can be configured to support a variety of different interfaces, such as Ethernet, DS1, OC-12c, etc. As discussed in more detail below, native link interface 22 provides the data communications interface for a particular native flow type. According to one embodiment, the present invention can concurrently support a plurality of different native flow types.

FIG. 2 sets forth the functionality associated with native link interface 22 according to one embodiment of the present invention. As FIG. 2 illustrates, native link interface 22 comprises link interface 40 and functionality directed to the ingress and egress of native flows. Link interface 40 provides the communication interface for the ingress and egress of native flows. In one embodiment, the ingress flow functionality associated with native link interface 22 comprises ingress segmentation and reassembly (SAR) module 41, flow classification module 46, and connection identifier (CID) queuing module 48. To support the egress of native flows, native link interface 22 further comprises egress SAR module 42 and output queuing module 44.

A.1.a. Native Flow Ingress Functionality

Ingress SAR module 41 maps frames or cells associated with a native flow to a uniform cell format which link bonding engine 24 is able to process. In one embodiment, ingress SAR module 41 maps native flows into ATM cells or modified ATM cells including additional header information. For DS1 flows, for example, ingress SAR module 41 segments the DS1 flows into AAL1 flows. For Ethernet flows, ingress SAR module 41 segments such native Ethernet flows into AAL5 flows. As to native ATM flows, ingress SAR module 41 can operate to modify the cells to include additional header information, if any, such as connection identifiers, sequence numbers, etc. Otherwise, no SAR module is required for ATM flows where the internal cells transmitted across bonded link transmit/receive unit 20 are unmodified ATM cells.

Flow classification module 46 associates connection identifiers (CIDs) to native flows. A CID is a unique identifier associated with a native flow that is used by bonded link transmit/receive unit 20 in the transport of flows. In one embodiment, the CID is a 16-bit value. The functionality and operation of flow classification module 46 depends on the interface type. For DS1 and Ethernet flows, flow classification module maps different ports to specific CID values.

Other embodiments of the present invention can support more detailed classifications, including classifications based on VLAN ID, priority bits, and MAC addresses. For OC-12 and other ATM flows, flow classification module maps particular Virtual Path Identifier (VPI)/Virtual Circuit Identifier (VCI) pairs to specific CID values. In one embodiment, flow classification module 46 includes a CID table that facilitates the classification of flows from ports or VPI/VCI value pairs to CIDs. In one embodiment, the CID table is configured during the provisioning of the bonded link system described herein.

CID queuing module 48 maintains a plurality of CID queues and stores cells in a particular CID queue depending on CID identified by flow classification module 46. In one embodiment, CID queuing module 48 includes a cell memory for storing cells associated with flows and a plurality of CID queues including pointers to cells in the cell memory. In one embodiment, CID queuing module 48 signals link bonding engine 24 when a particular CID queue contains internal cells comprising a complete native frame.

A.1.b. Native Flow Egress Functionality

To allow for the egress of native flows, native link interface 22 comprises output queuing module 44 and egress SAR module 42. Output queuing module 44 buffers individual cells to be transported in the egress direction. Egress SAR module 42 maps flows in the internal cell format associated with bonded link transmit/receive unit 20 to their native cell or frame format.

A.2. Link Bonding Engine

FIG. 3 illustrates the functionality of link bonding engine according to one embodiment of the present invention. Link bonding engine 24, in one embodiment, comprises bonded link transmitter 51 and bonded link receiver 52. Other functionality not illustrated in FIG. 3 includes cell memory associated with bonded link transmitter 51 and bonded link receiver 52. Cells transmitted to link bonding engine 24 are stored in a cell memory that buffers the cells. The various modules and data structures that implement the link aggregation functionality of bonding engine 24, in one embodiment, operate on or manipulate pointers to the individual cells stored in the cell memory. One of ordinary skill in the art will recognize, however, that the present invention does not depend on the exact operation of the cell memory or the management of the cell memory.

A.2.a. Bonded Link Transmitter

As FIG. 3 illustrates, bonded link transmitter 51 comprises frame scheduler 55, bonded link queue 57, sequence number generator 59, and port queue scheduler 61. Frame scheduler 55 arbitrates among CID queues that include internal cells spanning a complete native frame for insertion into a bonded link queue maintained by bonded link queuing module 57. Bonded link queuing module 57 maintains one or more bonded link queues that store CID pointers indicating complete native frames in the CID queues of CID queuing module 48. In one embodiment, bonded link queuing module 57 comprises a fast path bonded link queue and a slow path bonded link queue. As discussed in more detail below, fast path flows are scheduled on the fast path bonded link queue, white slow path flows are scheduled on the slow path bonded link queue. Sequence number generator 59 generates a cell sequence number for each internal cell written from bonded link queue module 57. In one embodiment, sequence number generator 59 generates a 16-bit contiguous cell sequence number. In one embodiment, sequence number generator 59 also generates a super frame when the sequence number value rolls over, as discussed in more detail below. Port queue scheduler 61 schedules cells maintained in bonded link queuing module 57 for transmission across selected bonded links 30.

A.2.b. Bonded Link Receiver

Bonded Link receiver 52, in one embodiment, comprises sequence queuing module 56 and flow queuing module 58. Sequence queuing module 56 is operative to sequence cells associated with a data flow transmitted across bonded links 30. Flow queuing module 58 buffers cells written from the sequencing queuing module 56 as discussed more fully below. Flows buffered by flow queuing module 58 are ultimately transmitted to output queuing module 44 of native link interface 22 for transport.

A.3. Bonded Link Interface

FIG. 4 illustrates the functionality of bonded link interface 26 according to one embodiment of the present invention. As discussed above, bonded link interface 26 is operative to transmit and receive data streams across physical link 30. Physical links 30, in one embodiment, are xDSL links transmitting and receiving signals across conventional twisted-pair cabling. In addition, as discussed more fully below, bonded link interface 26 includes functionality that accesses fast and slow path ports of the xDSL interfaces. For example, in one embodiment, constant bit-rate (CBR) flows are transmitted over xDSL fast paths, while non-CBR flows are transmitted across xDSL slow paths. Accordingly, bonded link interface 26 includes functionality supporting such functions. To support the transmission of data across physical link 30, bonded link interface 26, in one embodiment, comprises fast path port queue 78, slow path port queue 79, fast path transmit SAR module 74, slow path transmit SAR module 76 and xDSL transmit interface 72. To allow for reception of data across physical link 30, bonded link interface 26 further comprises xDSL receive interface 71, fast path queue 73, slow path queue 75, and receive SAR module 77.

Fast path and slow path port queues 78 and 79 buffer cells associated with data flows for transmission across physical link 30. Fast path and slow path SAR modules 74 and 76 aggregate individual cells into bonded link frames for transmission across physical links, as discussed more fully below. xDSL transmit interface 72 is operative to transmit bonded link frames across link 30. xDSL receive interface 71 is operative to receive data flows transmitted across link 30. Fast and slow path queues 73 and 75 buffer bonded link frames transmitted over physical link 30. Receive SAR module 77 segments bonded link frames into individual cells as discussed more fully below.

B. Bonded Link Protocol Scheme

As discussed in more detail below, the data transport protocol scheme implemented across bonded links 30, according to one embodiment of the present invention, allows for a cell aggregation and encapsulation scheme that efficiently adapts to the train rate of each bonded link 30, while not compromising the quality of service (QoS) across the links. That is, transmission of large frames can compromise the QoS across the link and cause head of line (HOL) blocking. HOL blocking occurs when a high priority, low delay voice packet/cell cannot be emitted onto a link because it is behind a large data packet/cell. As discussed below, the largest bonded link frame size that is allowed on a particular bonded link 30 is configured based on the train rate (bandwidth) of that link to ensure that high priority traffic, such as voice traffic, is guaranteed an acceptable maximum link delay. In other embodiments, the maximum bonded link frame size is a static value configured without regard to the train rate of the physical link. In one such embodiment, the largest link frame size is uniform across all bonded links.

B.1. Link Encapsulation Scheme

Figure 5:
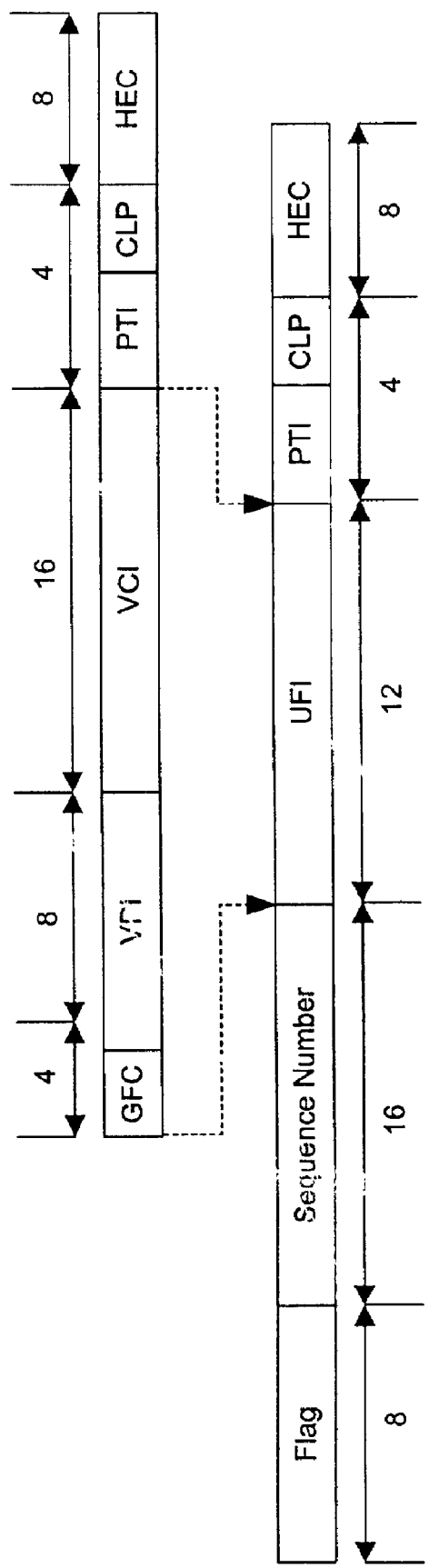
FIG. 5 illustrates the mapping of an ATM cell header to the header of a bonded link frame according to one embodiment of the present invention.

FIG. 5 illustrates the fields in the header of a bonded link frame, according to one embodiment, as well as the mapping of such fields to an ATM header. As FIG. 5 shows, in one embodiment, the bonded link encapsulation protocol provides transparency to ATM flows by mapping the ATM overhead bits into the overhead bits of the bonded link frame. The bonded link encapsulation scheme maps the ATM management/control bits, and supports the flexible mapping of the user flow identifications (UFI) bits. The ATM overhead bits can be mapped into two different categories: 1) management/control bits, and 2) user flow identification (UFI) bits. In one embodiment, there is a one-to-one mapping of the CID values associated with individual cells to the UFI value in the bonded link frame header.

The bonded link frame header segment can be any number of bits in length depending on sequence number and UFI field widths. Table 1 sets forth the field widths and values of the bonded link frame header according to one embodiment of the present invention. In the embodiment illustrated in FIG. 5, the UFI field spans 12 bits and the sequence number spans 16 bits; therefore, the bonded link frame header is 48 bits. As discussed below, a unique UFI/CID value in the UFI field of the bonded link encapsulation format maps to a particular VPI/VCI ATM header value to allow for complete ATM service inter-working and transparency. In one embodiment, the least significant 5 bits of the ATM VCI field map to the least significant 5 bits of the UFI field. This allows for end-to-end operations of the following ATM flows: 1) OAM Fault Management and Performance Monitoring; 2) Signaling; 3) ILMI; 4) Resource Management Flows; and 5) Congestion Notification. In addition, as to non-ATM flows, such as Ethernet and DS1, different ports map to specific CIDs in the UFI field.

As FIG. 6 illustrates, the payload of bonded link frame 100 comprises 1 to N internal cell payloads. For example, where the internal cell format is derived from ATM, the bonded link frame payload comprises 1 to N 48-byte payloads. In one embodiment, the maximum number of ATM payloads encapsulated within the bonded link frame 100 is limited to 32. Therefore, a large Ethernet frame of 1526 bytes can be encapsulated within a single bonded link frame (i.e., link header and 32 48-byte data segments), assuming that the train rate of the line is sufficient to prevent undesired HOL conditions (see below). Of course, the maximum number of cell payloads can be extended to support larger native frame types, such as jumbo Ethernet frames.

B.1.a. Head of the Line Blocking

In one embodiment, in order to guarantee a QoS level to high priority traffic, such as voice traffic, the size (i.e., the number of ATM payloads) of the bonded link frame 100 transmitted across a given bonded link 30 depends on the train rate (bandwidth) associated with that link and the desired QoS requirements. Maximum efficiency is obtained by transmitting native frames without segmentation to minimize the overhead associated with frame headers. As discussed above, however, the transmission of large frames raises concerns about delivering quatity of service across the link and, more specifically, concerns about "head of the Line" blocking issues. "Head of the tine" blocking occurs when a high priority, low-delay voice packet is stuck behind a large data packet. The largest frame size that is allowed on a given link 30, white still delivering maximum delay guarantees to high priority, voice traffic (for example), will depend on the link bandwidth. For didactic purposes, the $N_{port}$ parameter specifies the maximum number of internal cell payloads a bonded link frame can span for a given link (see Section II.B., infra). Table 2 sets forth an analysis of the effect of link bandwidth on maximum frame size given a maximum blocking delay of 5 milliseconds (ms). Of course, one skilled in the art will recognize that the maximum bonded link frame size will vary depending on the desired maximum blocking delay.

TABLE 1

Bonded Link Frame Header Definitions

| Field | Bits | Description |
| --- | --- | --- |
| Flag | 8 | Used by the AHDLC mechanism for delineating frame boundaries |
| Sequence Number | 16 | Contiguous 16-bit cell sequence number added to each cell of a group that is being transmitted over a bonded link. |
| UFI | 12 | User Flow Identification. Field which, among other things, can identify a flow as belonging to a specific group of bonded links. |
| PTI | 3 | Descriptor in an ATM cell header that indicates whether the cell is a user cell or a management cell. |
| CLP | 1 | Cell Loss Priority, identifies this cell as a low priority cell that can be discarded during congestion. |
| HEC | | Header Error Protection field. For detection and correction of all single bit header errors and most multiple bit header errors. |

TABLE 2

Link Speed v. Bonded Link Frame Size

| Math: | Fast | Typical | Slow | Very Slow |
|---|---|---|---|---|
| Link Frequency (Mbits/s): | 51.00 | 3.00 | 0.512 | 0.064 |
| Maximum Blocking Delay (ms): | 5 | 5 | 5 | 5 |
| Largest Packet Size (bytes): | 31,875 | 1,875 | 320 | 40 |

Table 2 reveals some interesting conclusions. The first being that for most VDSL deployments, Ethernet frames can be sent without segmentation, while still achieving the required quality of service. Secondly, for low-end link bandwidth boundary conditions, Ethernet or other large native frames should be transmitted with an ATM like granularity, i.e. segmentation is needed. As discussed above, in one embodiment, the encapsulation/bonding scheme according to the present invention allows for configurable segmentation boundaries specific to the train rate of each bonded link 30 to maximize the efficiency of each link and allow for delivery of desired QoS levels. In one embodiment, the maximum bonded link frame size for a given link 30 is configured when the bonded link system of the present invention is provisioned. That is, bonded link transmit/receive unit 20 observes the train rate of a given link and configures the maximum bonded link frame size for that link based on the observed train rate. Bonded link transmit/receive unit 20 then repeats this process for all links 30. In embodiments using xDSL bonded links, the link speed is obtained using standard xXDSL functionality that measures the train rate of the link during a retraining or initialization event. Accordingly, the maximum bonded link frame size varies depending on the observed speed of the link. In one embodiment, the bonded link frame size, after the initial configuration, remains static for a given link until it is manually reconfigured or a re-training event occurs. In another embodiment, the maximum bonded link frame size can be dynamically configured in response to variations in link speed observed during operation of the system.

B.2. Sequence Numbers

As discussed above, sequence number generator 59 generates a sequence number for each individual cell transmitted across a bonded link 30. As discussed more fully below, the sequence numbers are used to reproduce the correct order of the individual cells on the receiving end of bonded links 30. As FIG. 5 illustrates, the bonded link header 100 also includes a sequence number field. However, since a given bonded link frame may comprise 1 to N individual cell payloads, one embodiment of the present invention implements a convention allowing for recovery of sequence numbers associated with corresponding individual cells. That is, when individual cells are aggregated into a bonded link frame for transmission across a physical link 30, the sequence number in the bonded link frame header is the sequence number of the first cell in the sequence. At the receive-end, the sequence numbers of the remaining cells in the bonded link frame header are recovered by referring to the sequence number in the header and that cell's position in the bonded link frame.

The size of the sequence number must allow for three boundary conditions: 1) the situation where the bonded links 30 are running at different speeds; 2) the situation where the links are running at maximum speed but with the absolute worst-case link delay difference; and 3) the combination of boundary conditions 1) and 2). To calculate the required sequence number size under worst-case link bandwidth differences, the following parameters are examined: a) the largest packet size to be sent continuously across one link; b) the smallest packet size to be sent continuously across one link; c) the largest bandwidth difference allowed between links, while still utilizing the slowest link; d) the maximum number of bonded links; and e) the amount of rollover margin needed (binary function that should be at least a factor of 4, i.e. 2 binary bits).

Table 3, below, illustrates the factors considered for determining the requisite number of bits for the sequence number, according to one embodiment of the present invention, to accommodate the boundary conditions associated with differences in link bandwidth. As Table 3 reveals, the absolute speed of the links does not affect the requisite bit-length of the sequence number; rather, the main factors are the maximum allowable bandwidth difference between the fastest and slowest bonded link and the difference between the largest and smallest packet transmitted across the link. As Table 3 illustrates, the required number of bits in the sequence number given the parameters set forth below is 16 bits.

TABLE 3

Required Sequence Number Length

| Math: | Fast | Typical | Slow |
|---|---|---|---|
| Fastest Link Frequency (Mbits/s): | 51.00 | 5.00 | 0.512 |
| Maximum Number of Links: | 64 | 64 | 64 |
| Slowest Link of Interest Factor: | 8 | 8 | 8 |
| Slowest Link Speed (Mbits/s): | 6.38 | 0.63 | 0.064 |
| Smallest Packet Size (bytes): | 53 | 53 | 53 |
| Largest Packet Size (bytes): | 1518 | 1518 | 1518 |
| Longest Link Delay (ms): | 200 | 200 | 200 |
| Transmission Delay on Fastest Link Largest Packet (ms): | 0.24 | 2.43 | 23.72 |
| Transmission Delay on Fastest Link Smallest Packet (ms): | 0.01 | 0.08 | 0.83 |
| Transmission Delay on Slowest Link Largest Packet (ms): | 1.90 | 19.43 | 189.75 |
| Transmission Delay on Slowest Link - Smallest Packet (ms): | 0.07 | 0.68 | 6.63 |
| Max Outstanding Cells on Fastest Link during Slow Link Window: | 230 | 230 | 230 |
| Max Outstanding Cells on All Links during Slow Link Window: | 14490 | 14490 | 14490 |
| RollOver Margin Factor: | 4 | 4 | 4 |
| Sequence Number Count with Margin: | 57960 | 57960 | 57960 |
| Sequence Number Bits Needed: | 16 | 16 | 16 |

Table 4 illustrates the parameters required to calculate the required sequence number size under absolute worst-case link delay differences: 1) the smallest packet size to be sent continuously across one link; 2) the fastest link speed; 3) the maximum number of bonded links; and 4) the amount of rollover margin needed (binary function that should preferably be a factor of 4 (2-bits). As Table 4 demonstrates, a 30-bit sequence number is required to accommodate the absolute link delay differences and other conditions set forth below. One skilled in the art will recognize, however, that different operating conditions may require different bit lengths.

TABLE 4

Absolute Link Delay Differences

|  | OC-1 | OC-12 | GigE | 10 GigE |
|---|---|---|---|---|
| Fastest Link Speed (Mbits/s): | 51 | 622 | 1,000 | 10,000 |
| Maximum Number of Links: | 64 | 64 | 64 | 64 |
| Maximum Allowed Absolute delay Difference (ms): | 200 | 200 | 200 | 200 |
| Smallest Packet Size (bytes): | 53 | 53 | 64 | 64 |
| Number of Packets on Single Link in Delay Window: | 24,057 | 293,396 | 390,625 | 3,906,250 |
| Number of Packets on All Links in Delay Window: | 1,515,566 | 18,483,962 | 24,609,375 | 246,093,750 |
| Rollover Margin Factor | 4 | 4 | 4 | 4 |
| Sequence Number within Margin | 6062264.151 | 73935849.06 | 98437500 | 984375000 |
| Sequence Number Bits Needed: | 23 | 27 | 27 | 30 |

B.3. Super Frames

To reduce the overhead associated with the sequence numbers, embodiments of the present invention introduce a super frame including a super frame sequence number to reduce the required length of the sequence number field for the individual user cells. As discussed above, in one embodiment, the bonded link encapsulation scheme utilizes a 16-bit sequence number in every individual user cell, and then bounds the user cells by super frames, which carry a 32-bit super frame sequence number. The super frames repeat on every link every 14-bit rollover event for the user cell sequence number. Accordingly, due to the low repetition rate of the super frame, it has a very limited consequence on user bandwidth efficiency. Although the primary function of the super frame is to limit the required size of the user cell sequence number, as Table 5 illustrates it can also be used for individual link and link group status monitoring.

TABLE 5

Super Frame Fields

| Field | Bytes | Definition |
|---|---|---|
| Flag Delimiter | 1 | Used by the AHDLC mechanism for delineating frame boundaries |
| Bonded Link Header | 4 | |
| Equipment Type | ½ | A 4-bit value that indicates the type of equipment feeding the bonding scheme. |
| Version | ½ | Indicates the version number of the IM-D protocol. Allows for in-band communication of protocol updates. |
| MAC address | 6 | This is the MAC address of the unit that is delivering the flow. |
| MAC ID | 1 | |
| Sequence Number | 4 | Contains a 32-bit sequence number |
| Link ID | 1 | Utilized to communicate far-end link status information. The status information is communicated across all links, and contains the status information for all the links. |
| Link Status Change | 1 | This 8-bit counter increments each time a change has occurred to one of the link status information bytes. |
| Group Status and Control | 1 | This 8-bit field is used to synchronize IMD group state-machines at the far-end and the near-end. |
| Link Count | 1 | This is 8-bit field is used to communicate the number of configured links for the connection. This field is introduced so as not to burden the super-frame with having to communicate the status for non-utilized link status information elements. |
| Link Status 'X' | 8 | This 8-bit field is used to indicate the status of link number 'X' to the far-end. |
| Frame FCS | 4 | The super-frame is protected by a CRC-10 field. |

II. Transmitting Flows Across Bonded Links

A. Processing of Native Flows

As discussed above, native link interface 22 is operative to receive incoming native flows, such as ATM, DS1 and/or Ethernet Flows, and process them into an internal cell format to facilitate processing and scheduling of the flows by link bonding engine 24. FIGS. 7A and 7B illustrate the process flow associated with receiving incoming native flows. As FIG. 7A illustrates, link interface 40 receives a native flow (step 202) and passes it to ingress SAR module 41. Ingress SAR module 41 transforms the native flow into an internal cell format (step 204) and stores it in a cell memory. In one embodiment, the internal cell format is an ATM cell or a modified ATM cell including additional header information (see above). Flow classification module 46 then operates on attributes of the flow to identify a CID from the CID table (step 206) and passes the native flow and the CID value to CID queuing module 48 (step 208). CID queuing module 48 stores the cells comprising the native flow or pointers to such cells in the cell memory in a CID queue based on the identified CID value. That is, CID queuing module 48 receives a cell (step 210) and stores it or a pointer to it in the appropriate CID queue (step 212). When a complete native frame is buffered within a given CID queue (step 214), that CID queue becomes valid and can become a contender with other valid CID queues for scheduling by frame scheduler 55 of link bonding engine 24. When a CID queue becomes valid, CID queuing module 48 passes the CID cell head pointer and the number of cells within the native frame to frame scheduler 55 (step 216).

B. Scheduling of Flows for Transmission Across Bonded Links

Frame scheduler 55, in one embodiment, chooses a valid CID queue from among the valid CID queues based on round-robin arbitration. Other forms of arbitration are also possible, such as weighted fair queuing, class based queuing, weighted round-robin arbitration, etc. When a valid CID queue is chosen, frame scheduler 55 writes the flow parameters (CID and number of cells) into either the slow path or fast path queue, as appropriate, of bonded link queuing module 57. In one embodiment, certain CIDs map to the fast path queue, while other CID values map to the slow path queue. The fast and slow path queues maintained by bonded link queuing module 57, in one embodiment, contain back to back pointers which are essentially per-CID pointers indicating complete frames within the CID queues. In one embodiment, the fast and slow path queues of bonded link queuing module 57 assert a back pressure signal when their fill levels exceed a threshold, causing frame scheduler 55 to stop arbitration among the CID queues. Stopping CID queue arbitration eventually causes the source native link interfaces 22 for the affected flows to become backpressured, which invokes appropriate flow control processes. Frame scheduler 55 can restart the arbitration when the bonded link queue fill level has reduced.

Figure 7C:
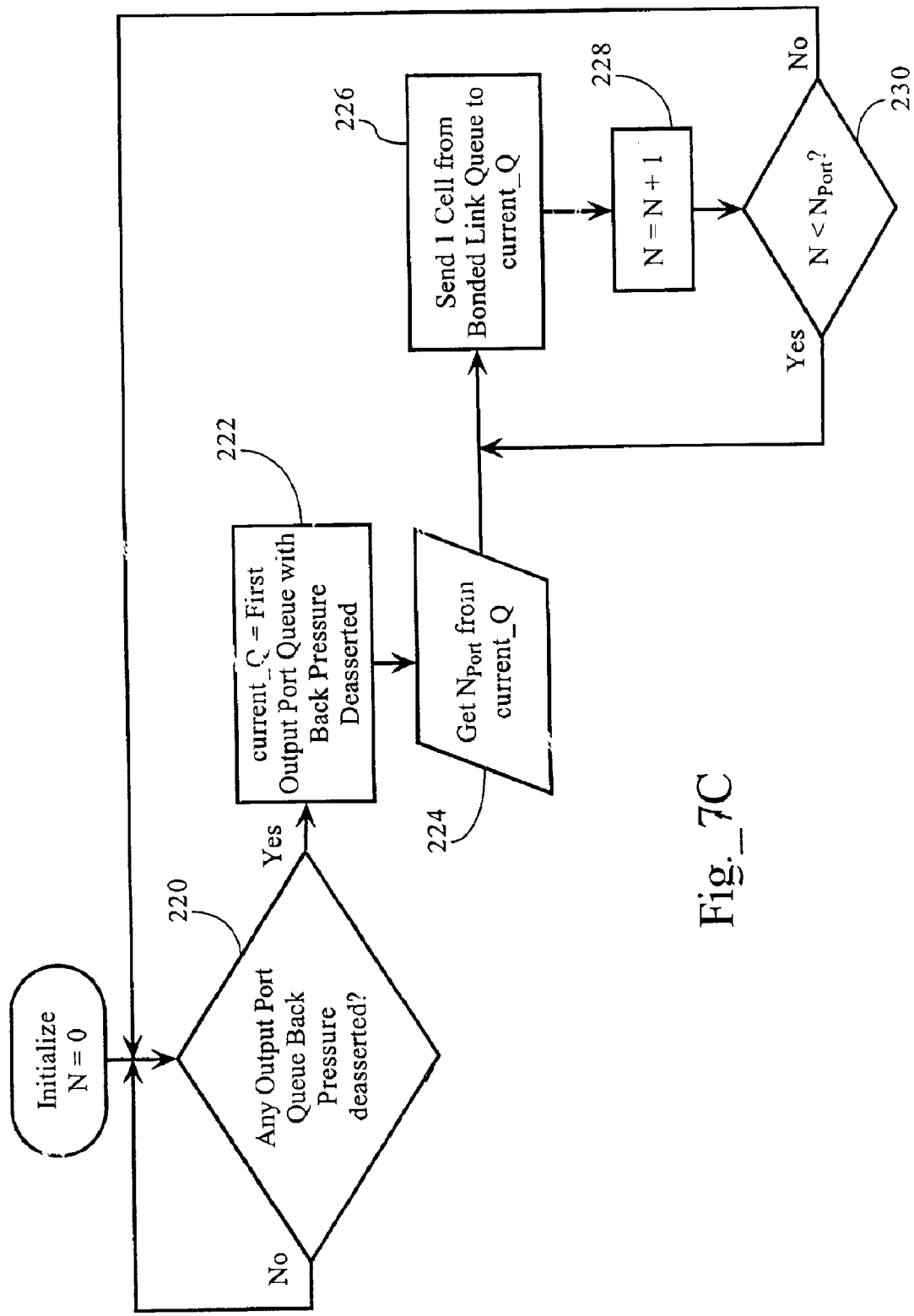

Port queue scheduler 61, as discussed more fully below, is operative to schedule the cells comprising a native flow stored in a queue maintained by bonded link queuing module 57 for transmission over one or more bonded links 30 by writing individual cells to an output port queue associated with bonded link interface 26. In one embodiment, port queue scheduler 61 operates individually on the fast and slow path queues maintained by bonded link queuing module 57. In one embodiment, port queue scheduler 61 switches between operating on the fast path queue and the slow path queue maintained by bonded link queuing module 57 in a manner that guarantees a flow rate to the flows associated with the fast path. FIG. 7C illustrates a method, according to one embodiment of the present invention, implemented by port queue scheduler 61 to schedule a native flow for transmission across one or more bonded links 30. As discussed above, bonded link interface 26 includes a fast path port queue 78 and a slow path port queue 79. In one embodiment, all port queues 78, 79 associated with the bonded link interfaces 26 assert backpressure signals for flow control purposes to port queue scheduler 61 at a threshold fill level.

As FIG. 7C illustrates, port queue scheduler 61 does not select any output port queue 78 or 79 that asserts backpressure. As FIG. 7C illustrates, port queue scheduler 61 first determines whether any output port queues have de-asserted their respective backpressure signals (step 220). If so, port queue scheduler 61 selects a first port queue (step 222) and retrieves the bonded link frame size ($N_{port}$) (i.e., the maximum number of cell payloads comprising the frame) associated with the selected port queue (step 224). Port queue scheduler 61 then sends a cell from a queue maintained by bonded link queue module 57 to the selected output port queue (step 226). Port queue scheduler 61 writes additional cells to the selected output port queue up to the bonded link maximum frame size ($N_{port}$) associated with that port (see steps 228 and 230). Port queue scheduler 61 repeats this process as long as a queue maintained by bonded link queuing module 57 contains data flows. As discussed above, port queue scheduler operates on the fast path queue maintained by bonded link queuing module 57 to schedule cells on fast path port queues 78 of bonded link interfaces 26 and operates on slow path queues to schedule cells to slow path port queues 79 of bonded link interface 26.

Sequence number generator 59, in one embodiment, generates a 16-bit contiguous cell sequence number for each cell as it is read from bonded link queuing module 57. When the 16-bit sequence number value rolls over (14-bit rollover event), sequence number generator 59 generates a superframe and sends it to all output port queues in the bonded link group for transmission across the bonded links 30. As discussed in more detail below, the cell sequence numbers, as well as the sequence numbers in the super frames, allow bonded link receiver 52 to recover and re-sequence the flows transmitted across bonded links 30.

C. Transmission of Flows Across Bonded Links

FIG. 7D illustrates the process flow, according to one embodiment, associated with transmission of cells across a bonded link. As discussed above, port queue scheduler 61 writes individual cells to either the fast path or slow path port queues 78 or 79, respectively. As shown below, native link interface 26 aggregates individual cells corresponding to a given CID into a bonded link frame and transmits them across bonded link 30. The process flow set forth in FIG. 7D, in one embodiment, is implemented separately for the fast and slow path port queues.

As to a given port queue 78 or 79, bonded link interface 26 receives a cell and stores it in the appropriate port queue (step 240). The first cell in the respective port queue 78 or 79 is passed to the corresponding SAR module 74 or 76, which collects the cells and aggregates the cell payloads into a bonded link frame. Specifically, if the CID associated with the cell is the same as the CID associated with the current frame (step 242), SAR module 74 or 76 adds the cell to the current bonded link frame (step 244). If the resulting frame size equals the maximum frame limit ($N_{port}$) (step 246), SAR module 74 or 76 completes processing of the bonded link frame and passes it to xDSL transmit interface 72 for transmission across the bonded link 30 (step 248). As part of the SARing process, the sequence number corresponding to the first cell payload is added to the bonded link frame header. The sequence numbers of subsequent cell payloads (corresponding to the same CID) are omitted. However, the order of the cell payloads in the bonded link frame corresponds to their original sequence numbers to allow for their recovery on the receiving end.

Otherwise, if the CID associated with the cell does not correspond to the CID of the current frame, SAR module 74 or 76 completes processing of the bonded link frame and passes the current bonded link frame to xDSL transmit interface 72 for ultimate transmission across the bonded link 30 (step 250). In addition, a new current frame is constructed setting the current frame CID to the CID associated with the cell. As above, SAR modules 74 and 76 collect cells until a different CID is encountered or $N_{port}$ number of cells have been collected. In one embodiment, if port queues are empty, idle bonded link frames are sent across link 30 to ensure the bit integrity of the link 30.

III. Receiving Flows From Bonded Links

As discussed below, bonded link transmit/receive unit 20 receives the bonded link frames and performs a SAR function to translate the bonded link frames into individual cells. The individual cells are then re-sequenced and passed to a native link interface for translation and transmission as a native flow. Received cells may not be in the order transmitted. Accordingly, to account for the uncertainty in receiving the cells in their correct sequences and for link delay differences, the cells are buffered for a delta time in a sequence queue before being read out of the queue and processed further.

In one embodiment, bonded link receiver 52 stores received individual cells in a cell memory. In one embodiment, bonded link receiver 52 stores the cells in a cell memory based on a free pointer address obtained from a free list pointer pool. One skilled in the art will recognize, however, that the details of cell memory implementation are not critical to the present invention. In one embodiment, sequencing module 56 inserts the pointers to the individual cell in the cell memory within a sequence queue based on the sequence number associated with the cell. As discussed in more detail below, sequencing module 56 buffers the cell pointers for a "delta" time period within their proper sequence order and then reads the sequenced cells out of the sequence queue. The delta time is initially configured for the sequence queue during installation or provisioning of the system. The delta value, in one embodiment, can also be dynamically adjusted based on actual bonded link conditions. This way sequencing module 56 can "tune" into real path delays and account for them during the sequencing operation. The delta time period, in one embodiment, is maintained by using a real-time counter and the sequence queue is accessed upon arrival of every user cell or idle cell. The CID and pointer values for the cells within the cell memory are read out in sequence and passed to flow queuing module 58. Flow queuing module 58 queues pointers to the individual cells in a CID queue corresponding to the CID value associated with the cell. In one embodiment, the CID queues maintained by flow queuing module 58 are link-lists of the cells per-CID (see FIG. 11). Of course, any suitable queuing data structure can be used.

Furthermore, as discussed below, flow queuing module 58, in one embodiment, also performs buffer management on the CID queues as required (i.e. programmed discards) and maintains per flow statistics. Flow queuing module 58 schedules individual flows based on their respective traffic parameters. In one embodiment, flow queuing module indexes the CID queues and retrieves the cell pointer at the head of queue (HOQ). The head pointer is passed to the cell memory manager and the cell is read from the memory and emitted from bonded link receiver 52 to the appropriate native link interface 22. Flow queuing module 58, in one embodiment, updates the flow queue head pointer with the next pointer in the link-list and writes the emitted pointer to the free list.

A. Receiving Bonded Link Frame and Segmenting into Individual Cells

On the receive-end, receive interface 71 receives the bonded link frames and stores them in fast path queue 73 or slow path queue 75, as appropriate, based on UFI field values. In one embodiment, receiving interface 71 performs a CID lookup that maps the UFI field values to corresponding CID values to allow receive SAR module to restore the individual cells. Receive SAR module 77 segments the bonded link frames into individual cells, giving priority to flows associated with fast path queue 73 as required to ensure desired QoS levels. In one embodiment, receive SAR module 77 restores the sequence number associated with each individual cell based on the sequence number of the bonded link frame and the individual cell's position in that frame. That is, the first cell payload is associated with the sequence number of the bonded link frame, the second cell payload is associated with the next contiguous sequence number, and so on. After segmentation, the individual cells are transmitted to sequencing module 56 for re-sequencing.

B. Re-Sequencing of Flows

When individual cells comprising a native flow are aggregated, packed in a bonded link frame and transmitted over bonded links 30, there are certain inherent delays that are encountered. Bonded link receiver 52, in one embodiment, accounts for three delays when trying to re-sequence the individual cells: 1) absolute delay (i.e., interleaving/propagation delay); 2) frequency delay (differences in link speed); and 3) N-delay (packetization/SARing delay).

FIG. 8A illustrates operation of sequencing module 56 of bonded link receiver 52. The function of sequencing module 56 is to reassemble the original data stream by using the sequence numbers, super-frames and, in one embodiment, idle cells. Sequencing, in one embodiment, is based on queuing the received cells according to their respective sequence number values for a delta time before reading out the recovered sequence. Due to the delays on the traffic, the delta time period accounts for the uncertainty in receiving individual cells with their sequence numbers and trying to sort them. A real-time counter is used to indicate the arrival time of the cell and to generate a timestamp that indicates the emission time of the cell from the sequence queue.

During the delta time, individual cells are written into a sequence queue and the read address is positioned to the cell with the lowest received sequence number. Reading the sequences from the memory begins delta time after the reception of the first cell within the sequence queue and from the lowest sequence number received within the delta time. As discussed below, the conditional read operation is performed each time sequencing module 56 encounters either a user cell or idle cell. As discussed below, the delta time period can be statically provisioned or it can be derived from link conditions.

B.1. Time Stamp

Operation of sequence module 56, in one embodiment, is time-based, meaning that individual cells are read out of the sequence queue delta time after being written into the sequence queue. A free running real-time counter, in one embodiment, indicates the time the cell has arrived at the sequence queue. The time stamp for a given cell is calculated as the time of the cell arrival plus the delta:

Timestamp=RT+Δ.

Figures 9A, 9B:
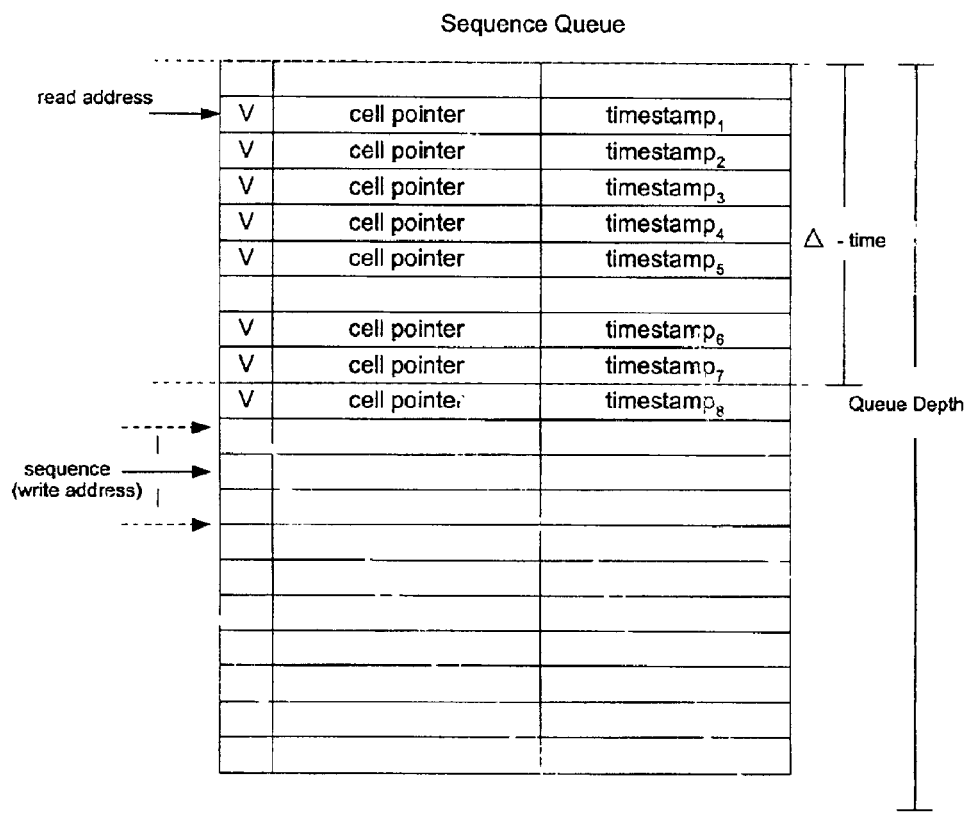
FIG. 9A illustrates a sequence queue, according to one embodiment of the present invention, adapted to re-sequence cells at the receiving end.
FIG. 9B is a diagram showing a sequencing data structure facilitating the sequencing operations discussed herein.

Therefore, the timestamp indicates when the cell should be read from the sequence queue. As FIG. 9A illustrates, the time stamp value is stored with the cell pointer within the sequence queue and, as discussed below, is compared to the current time (current global counter value) before a cell is emitted.

The real-time counter can be configured to provide a real time value. Alternatively, the real time counter can simply return a virtual time, such as a binary value tied to the cell time steps calculated from the total bonding bandwidth of the system. Assuming the total bonding bandwidth is 2.5 Gbps (for example), the increment rate of the real-time counter is calculated as follows:

$$\frac{2.5 \text{ Gbps}}{8*64} \cong 5M \text{ cells/sec} = (5M \text{ cells/sec})^{-1} = 200 \text{ ns/cell.}$$

In one embodiment, the bit length of the counter is larger than the length of the sequence queue to prevent time wrap around.

B.2. Super Frames and Dynamic Delta Updates

The delta value can be dynamically adjusted based on actual line conditions associated with the group of bonded links to allow sequence module 56 to tune into real path delays and account for them during the sequencing operation. As discussed above, sequence number generator 59 generates a super frame at each roll-over event and sends a copy of the super frame to each bonded link interface 26 for transmission over the bonded links 30. See FIG. 8B. Superframes are transmitted simultaneously to the bonded link interfaces 26 and, ultimately, are received at different intervals per link at the receiving-end. In one embodiment, the receiving end measures the time interval between receipt of the first super-frame and receipt of the last super frame for a given group of bonded links. The "delta" time is the time interval between receipt of the first and last super frames. In the didactic example provided by FIG. 8B, the delta time is, therefore: $\Delta = t_1 - t_{last}$.

When a counter associated with measuring the super frame interval times out and a super-frame is not received for a given link, the delta time is not updated. If a superframe is not received a threshold number of times for the same link, then the link is assumed down and is no longer taken into account for the delta derivation. Once the link is operational, however, it is again considered. When the delta value is updated, it is passed to sequencing module 56 to adjust its configuration to account for the changing link conditions.

B.3. Sequence Queue & Sequence Queue Memory Structure

In one embodiment, sequencing module 56 maintains a sequence queue and a separate data structure that facilitates management and operation of the sequence queue, such as the read and write operations described below. FIG. 9A illustrates a sequence queue according to one embodiment of the present invention. FIG. 9B illustrates a sequencing data structure, according to an embodiment of the present invention, facilitating operations associated with the sequence queue. The sequencing data structure, in one embodiment, is used to maintain the sequencing parameters to facilitate the writing and reading operations to be performed from the sequence queue. As discussed in more detail below, when the first user cell arrives, its arrival time is stored as a timestamp, (timestamp=Real Time+delta) in the sequencing data structure. As subsequent cells are written the lowest sequence number is maintained in the sequencing data structure, as well. The read operation becomes valid when the stored timestamp is equal to the current time. Once the read operation is valid, a read operation is performed each time a user or idle cell is received until the read address equals write address. At that point the read operation is re-initialized and becomes valid delta time after another user cell arrival.

The sequence queue is a circular queue with the length of the queue address bits programmed to the queue depth. In one embodiment, cells are inserted into the sequence queue based on their respective sequence numbers or the last N-bits of the sequence number. That is, the last N-bits of the sequence number map to a particular address or location in the sequence queue. The number of bits (N) and, hence, the size of the sequence queue depend on the effective bonding bandwidth of link bonding engine or at least the amount of bonding bandwidth allocated to the sequence queue. The factors that determine the size of the sequence queue are the bonding bandwidth (relative to the size of individual cells) associated with or allocated to the bonded links and the delta time. That is, the size of the queue must be sufficient to store the number of cells received during a time interval equal to the "delta" time, given the bandwidth of link bonding engine 24 or at least the bandwidth allocated to the bonded links. In one embodiment, the fields for each node of the sequence queue includes a pointer to the cell in the cell memory and a time stamp (time of cell arrival+delta). In one embodiment, the sequence queue also includes a valid bit indicating that the buffered cell is valid. When the cell is read from the sequence queue, the valid bit is reset.

Figure 10A:
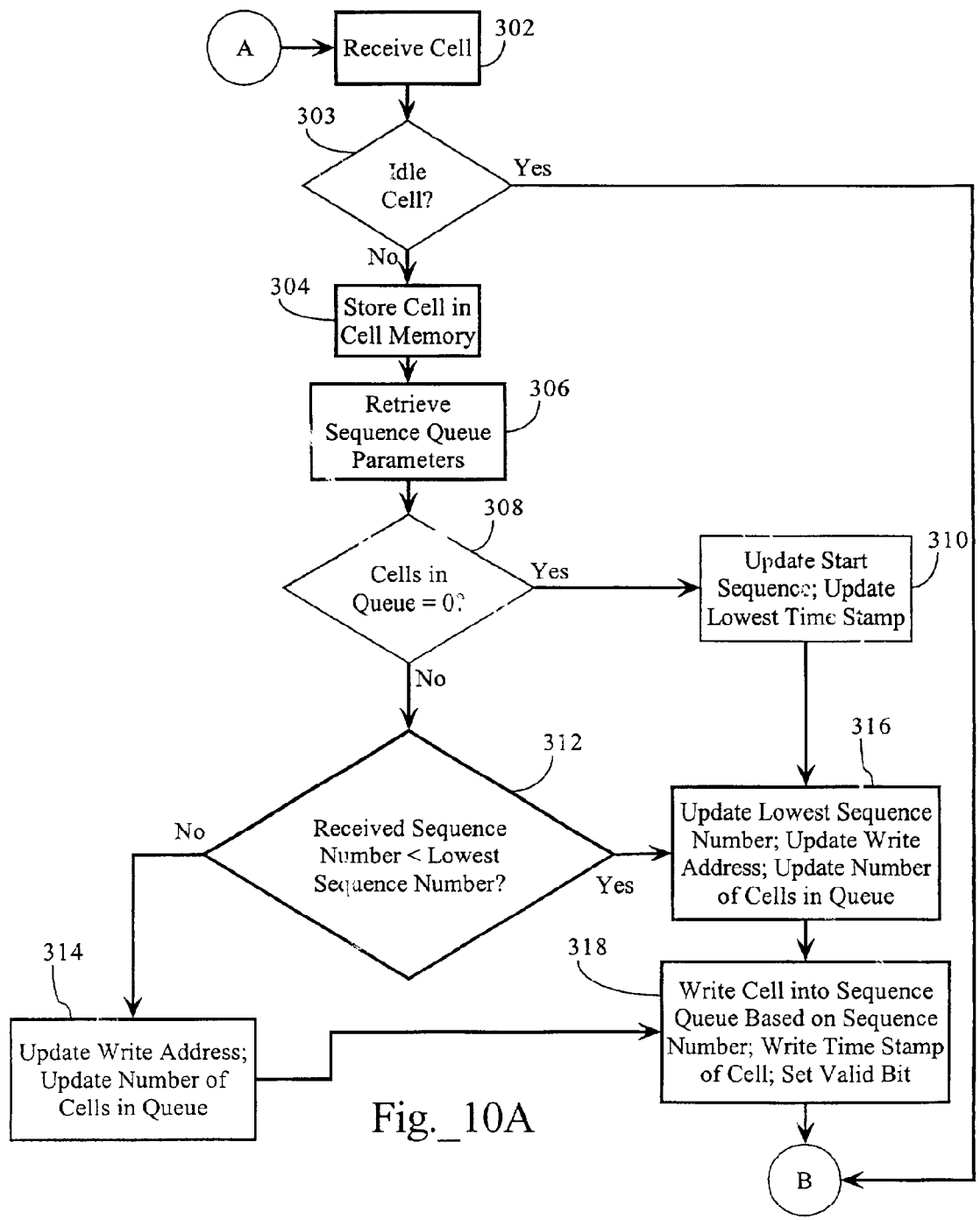
FIGS. 10A and 10B, together, are a flow chart diagram illustrating a method for operating on a sequence queue to allow for re-sequencing of data streams at the receiving end.
Figure 10B:
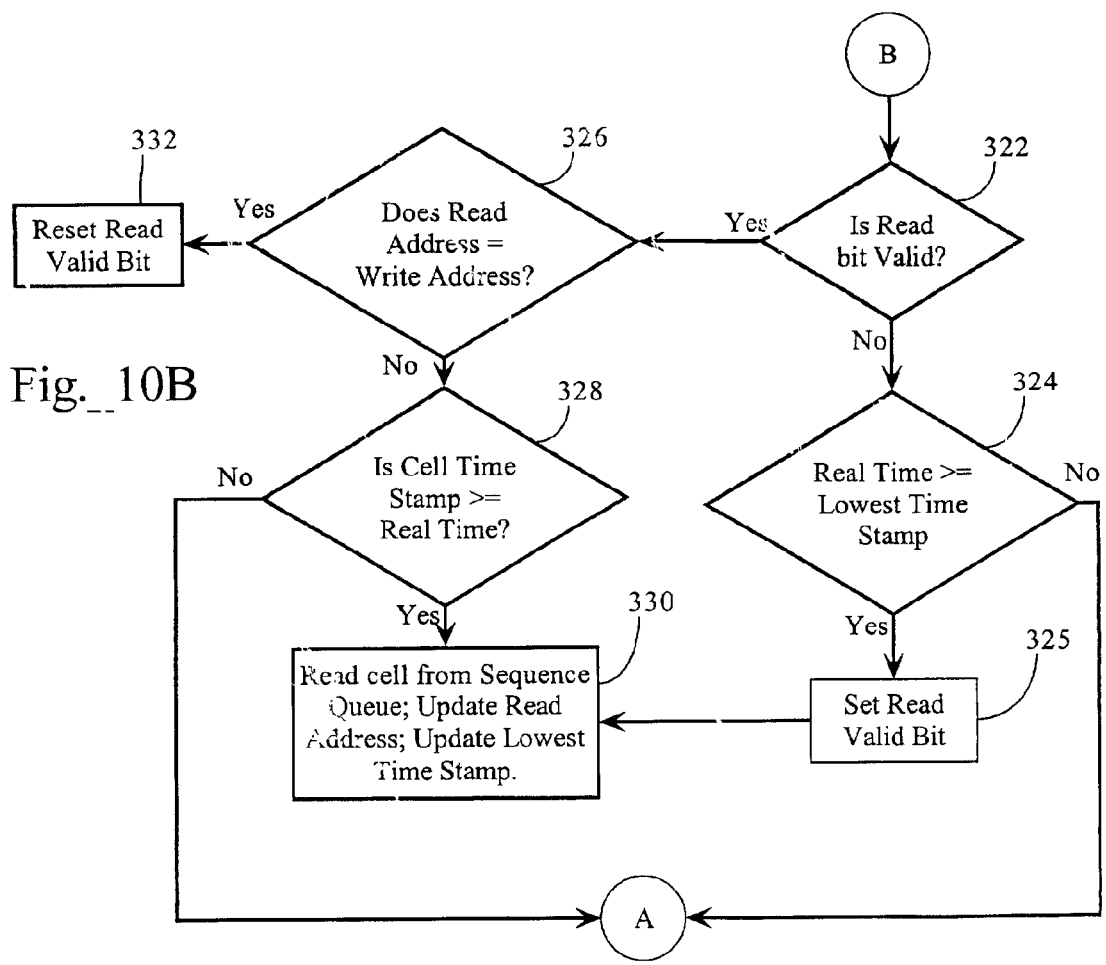

FIGS. 10A and 10B illustrate a method for operating on the sequence queue and sequencing data structure to sequence individual cells received over bonded links 30. As FIG. 10A provides, sequencing module 56 receives a cell (step 302) and determines whether the cell is an idle cell (step 303). If the cell is an idle cell, sequencing module 106 proceeds to the conditional read operation set forth below. Otherwise, sequencing module 56 stores the cell in cell memory (step 304) and retrieves the parameters maintained by the sequencing data structure (step 306). If the sequence queue is empty (step 308), sequencing queue updates the start sequence value and the lowest time stamp value in the sequencing data structure (step 310). Sequencing module 56 uses the start sequence value to keep track of the location in the queue of the first cell to arrive. If the sequence number of the received cell is less than the lowest sequence number stored in the sequencing data structure (step 312), sequencing module 56 updates the lowest sequence number in the sequencing data structure, as welt as the read and write addresses and the number of cells in the queue (step 316). The updated read address is determined by the relationship between the received sequence number and the previous lowest sequence number. If the sequence number of the received cell is greater than the lowest sequence number, sequencing module 56 updates the sequencing data structure to reflect the current write address and the number of cells in the queue (step 314). Sequencing module 56 then writes the received cell in the sequence queue based on its sequence number, writes the time stamp associated with the cell and sets the cell valid bit to "valid" (step 318).

As discussed above, sequencing module 56 then performs a read operation. In one embodiment, sequencing module 56 determines whether the read valid (RV) bit has been set in the sequencing data structure (step 322). If the read bit is not valid, sequencing module 56 compares the real time to the lowest time stamp stored in the sequencing data structure (step 324). If the real time is greater than the lowest time stamp, sequencing module 56 sets the read valid (RV) bit (step 325). Sequencing module 56 then reads the cell associated with the current read address in the sequencing data structure from the sequence queue and updates the read address and the lowest time stamp value in the sequencing data structure (step 330).

If the read bit was initially valid (step 322), sequencing module 56 then determines whether the current read address is equal to the write address (step 326). If so, sequencing module 56 resets the read valid bit to indicate "invalid." If the read address does not equal the write address, sequencing module 56 determines whether the time stamp of the cell associated with the current read address is greater than or equal to the current time (step 328). If so, the cell is not read from the sequence queue. Otherwise, sequencing module 56 reads the cell from the sequence queue and updates the read address and lowest time stamp value in the sequencing data structure (step 330). As discussed below, cells read out of the sequence queue are passed to flow queuing module 58.

B.4. Flow/CID Queues

When cells are read out of the sequence queue, they are buffered based on CID values within a corresponding flow/CID queue maintained by flow queuing module 58. In one embodiment, a scheduler associated with flow queuing module arbitrates among the flow queues to select cells to be passed to the appropriate native link interface 26 for transmission. The flow/CID queues are frame aware and, in one embodiment, when a respective flow queue reaches a pre-defined threshold level, the frame at the HOQ is discarded. In this situation the flow queues are not being emptied fast enough and the data at the HOQ is assumed to have expired. Discarding prevents HOL and allows new data to be continually removed from the flow queues. FIG. 11 illustrates the structure of the flow queues according to one embodiment of the present invention. The pointer memory is used to maintain the pointer link-lists for all cells and frames linked into the per-flow queue. The context memory contains all the per-flow parameters required for the per-flow cell queuing. Of course, the flow/CID queues can be implemented using any suitable data structure.

B.5. Egress from Native Link Interface

As discussed above, native link interface 22 comprises output queuing module 44 and egress SAR module 42. Output queuing module 44 buffers individual cells to be transported in the egress direction. In one embodiment, output queuing module 44 buffers individual cells until an entire native frame is stored. Output queuing module then passes the cells to egress SAR module 42. Egress SAR module 42 maps flows in the internal cell format associated with bonded link transmit/receive unit 20 to their native cell or frame format. For example, the individual cells comprising an Ethernet frame are reassembled into the native Ethernet frame and transmitted from native link interface 26.

Lastly, although the present invention has been described as operating in connection with DS1, Ethernet, and OC-12 traffic, the present invention can be applied to transparently transport a variety of native traffic types across the bonded links. Furthermore, although the embodiments discussed above have been described as bonding xDSL links, the bonding protocol and encapsulation scheme of the present invention can be applied to aggregate other types of links. In addition, the division of functionality set forth above between the link interfaces and the link bonding engine is not required by any constraint. For example, the CID queuing modules of the native link interface can be incorporated into the functionality of the link bonding engine. In addition, although embodiments of the present invention have been described as operating in connection with a single group of bonded links, other embodiments of the present invention can operate on a plurality of bonded link groups. In such an embodiment, the present invention can be configured to include a group identification (GID) indicating the group of bonded links. Furthermore, the queues in bonded link queue 57 can be extended to accommodate the additional groups of bonded links. In addition, the header field widths and other implementation details can vary depending on different operating conditions and requirements. Other embodiments of the present invention will be apparent to one of ordinary skill in the art. It is, therefore, intended that the claims set forth below not be limited to the embodiments described above.

What is claimed is:

1. An apparatus facilitating aggregation of at least two physical links into a logical link, comprising
   at least one native link interface operative to:
      receive native flows and transform the native flow into a plurality of user cells,
   a link bonding engine operative to:
      receive the plurality of user cells from the at least one native link interface,
      associate a sequence number to each of the plurality of user cells,
      schedule the plurality of user cells for transmission across one or more bonded links,
   at least two bonded link interfaces, wherein the at least two bonded link interfaces are operative to:
      receive user cells from the link bonding engine,
      aggregate the user cells into bonded link frames, wherein the bonded link frame header includes the sequence number associated with the first user cell in the bonded link frame, and
      transmit the bonded link frames across a physical link,
   wherein the at least two bonded link interfaces aggregate a maximum number of cells into a given bonded link frame, wherein the maximum number of cells is determined relative to the speed of the physical link and the size of the resulting bonded link frame, and
   wherein the link bonding engine schedules the plurality of user cells for transmission across the bonded links by arbitrating among the at least two bonded link interfaces, wherein the number of cells passed to each of the bonded link frames is the maximum number of cells that each bonded link interface aggregates into a bonded link frame.

2. The apparatus of claim 1 wherein the at least two bonded link interfaces are further operative to:
   receive bonded link frames, including a plurality of user cell payloads and a sequence number associated with the first user cell payload in the plurality, transmitted across a physical link,
   restore the user cells including their associated sequence numbers from the bonded link frames; wherein the link bonding engine is further operative to:

receive the individual cells from the at least two bonded link interfaces, sequence the individual cells based on their associated sequence numbers; and wherein the native link interface is operative to:

convert the individual cells into a native cell format, and transmit the native cells to a remote device.

3. The apparatus of claim 1 wherein the at least two bonded link interfaces are xDSL interfaces.

4. The apparatus of claim 1 wherein the at least one native interface comprises a DS1 interface.

5. The apparatus of claim 1 wherein the at least one native interface comprises an Ethernet interface.

6. The apparatus of claim 1 wherein the at least one native interface comprises an ATM interface.

7. An apparatus facilitating aggregation of at least two physical links into a logical link, comprising at least one native link interface operative to:
receive native flows and transform the native flow into a plurality of user cells, a link bonding engine operative to:
receive the plurality of user cells from the at least one native link interface,
associate a sequence number to each of the plurality of user cells,
schedule the plurality of user cells for transmission across one or more bonded links, at least two bonded link interfaces, wherein the at least two bonded link interfaces are operative to:
receive user cells from the link bonding engine,
aggregate the user cells into bonded link frames, wherein the bonded link frame header includes the sequence number associated with the first user cell in the bonded link frame, and
transmit the bonded link frames across a physical link, wherein the bonded link frame header further comprises the cell payloads corresponding to the user cells ordered according to the sequence numbers associated with each cell payload.

8. The apparatus of claim 7 wherein the at least two bonded link interfaces aggregate a maximum number of cells into a given bonded link frame.

9. The apparatus of claim 8 wherein the maximum number of cells is determined relative to the speed of the physical link and the size of the resulting bonded link frame.

10. The apparatus of claim 8 wherein the link bonding engine schedules the plurality of user cells for transmission across the bonded links by arbitrating among the at least two bonded link interfaces, wherein the number of cells passed to each of the bonded link frames is the maximum number of cells that each bonded link interface aggregates into a bonded link frame.

11. An apparatus facilitating aggregation of at least two physical links into a logical link, comprising at least one native link interface operative to:
receive native flows and transform the native flow into a plurality of user cells, a link bonding engine operative to:
receive the plurality of user cells from the at least one native link interface,
associate a sequence number to each of the plurality of user cells,
schedule the plurality of user cells for transmission across one or more bonded links, at least two bonded link interfaces, wherein the at least two bonded link interfaces are operative to:
receive user cells from the link bonding engine,
aggregate the user cells into bonded link frames, wherein the bonded link frame header includes the sequence number associated with the first user cell in the bonded link frame, wherein the link bonding engine is further operative to generate a super frame upon a sequence number rollover event and transmit a copy of the super frame to the at least two bonded link interfaces for transmission across the physical links, wherein the super frame includes a super frame sequence number.

12. An apparatus facilitating aggregation of at least two physical links into a logical link, comprising at least one native link interface operative to:
receive native flows and transform the native flow into a plurality of user cells, a link bonding engine operative to:
receive the plurality of user cells from the at least one native link interface,
associate a sequence number to each of the plurality of user cells,
schedule the plurality of user cells for transmission across one or more bonded links, at least two bonded link interfaces, wherein the at least two bonded link interfaces are operative to:
receive user cells from the link bonding engine,
aggregate the user cells into bonded link frames, and
transmit the bonded link frames across a physical link, wherein the link bonding engine comprises a frame scheduler, a bonded link queue, a sequence number generator and a port queue scheduler;

wherein the frame scheduler is operative to push identifiers each corresponding to individual user cells associated with a complete native frame onto the bonded link queue;

wherein the port queue scheduler, based on the state of the bonded link queue, is operative to schedule individual users cells associated with complete native frame for transmission across one or more physical links; and wherein the sequence number generator is operative to generate a contiguous sequence number for the individual user cells scheduled by the port queue scheduler.

13. The apparatus of claim 12 wherein the sequence number generator is further operative to generate a super frame at a sequence number roll-over event and transmit the super frame to the port queue scheduler and transmit a copy of the super frame to the at least two bonded link interfaces for transmission across the physical links.

14. An apparatus facilitating aggregation of at least two physical links into a logical link, comprising at least two bonded link interfaces operative to:
receive bonded link frames, including a plurality of user cell payloads and a sequence number associated with the first user cell payload in the plurality, transmitted across a physical link,
restore the user cells including their associated sequence numbers from the bonded link frames, a link bonding engine operative to:
receive the individual cells from the at least two bonded link interfaces,
sequence the individual cells based on their associated sequence numbers, wherein the link bonding engine comprises a sequence queuing module operative to buffer individual user cells based on their corresponding sequence numbers; and at least one native link interface operative to:

convert, the individual cells into a native cell format, and transmit the native cells to a remote device.

15. The apparatus of claim 14 wherein the link bonding engine is operative to:

receive an individual cell into a cell memory;

insert a pointer to the individual cell into the sequence queue based upon the sequence number associated with the individual cell;

schedule the individual cell for transmission by reading the pointer to the individual cell from the sequence queue a given delta amount of time after receiving the individual cell.

16. The apparatus of claim 15 wherein the delta amount is a predetermined amount of time.

17. The apparatus of claim 15 wherein the delta amount is based upon a real-time evaluation of at least one characteristic associated with the physical links.

18. The apparatus of claim 17 wherein the at least one characteristic is link speed.

19. The apparatus of claim 17 wherein the at least one characteristic is packetization delay.

20. A method allowing for aggregation of a plurality of physical links into a logical link, comprising receiving a native flow;

transforming the native flow into user cells;

associating a sequence number to each of the plurality of user cells;

aggregating the user cells into bonded link frames, wherein the bonded link frames include at least one sequence number corresponding to one of the user cells; and transmitting the bonded link frames across one or more physical links of the plurality of physical links;

wherein the number of cell payloads in each bonded link frame depends on the link speed of the physical link over which it is transmitted, and wherein the bonded link frame comprises a plurality of user cell payloads and a sequence number associated with the first user cell payload in the plurality of user cell payloads;

receiving the bonded link frames;

recovering the user cells from the bonded link frames;

re-sequencing the user cells based on the sequence numbers associated with the user cells; and transforming the user cells into a native flow format; and wherein the recovering step comprises generating an individual user cell including the sequence number and the first cell payload;

incrementing the sequence number and repeating the generating step for all remaining user cell payloads in the plurality.

21. A system allowing for aggregation of a plurality of physical links into a logical link, comprising a first link bonding engine operably coupled via a plurality of physical links to a second link bonding engine;

wherein the first link bonding engine is operative to:
receive native data streams;
convert native data streams into user cells of uniform size;
associate contiguous sequence numbers to the user cells;
aggregate the user cells into bonded link frames, wherein the bonded link frames comprise at least one user cell payload and the sequence number associated with the first of the at least one user cell payload; and
transmit the bonded link frames across at least one of the plurality of physical links;

wherein the size of each bonded link frame is determined by the speed of the physical link over which it is transmitted and a maximum delay time;

wherein the second link bonding engine is operative to recover the native data stream from the bonded link frames, and wherein the second link bonding engine is operative to:
receive the bonded link frames;
recover the user cells based on the sequence number and use cell payloads of each bonded link frame; and
sequence the user cells based on the sequence numbers associated with each user cell.

22. The system of claim 21 wherein the number of user cell payloads in each bonded link frame depends on the speed of the physical link over which it is transmitted.

* * * * *